(12) United States Patent
Kitayama

(10) Patent No.: US 10,165,135 B2
(45) Date of Patent: Dec. 25, 2018

(54) INFORMATION PROCESSING APPARATUS HAVING IMPROVED OPERABILITY OF SETTING SCREEN AND INFORMATION PROCESSING METHOD THEREFOR

(71) Applicant: Akiko Kitayama, Kanagawa (JP)

(72) Inventor: Akiko Kitayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 6 days.

(21) Appl. No.: 15/256,823

(22) Filed: Sep. 6, 2016

(65) Prior Publication Data
US 2017/0078503 A1 Mar. 16, 2017

(30) Foreign Application Priority Data

Sep. 15, 2015 (JP) ................ 2015-182046

(51) Int. Cl.
*H04N 1/00* (2006.01)
*G06F 3/12* (2006.01)

(52) U.S. Cl.
CPC ....... *H04N 1/00424* (2013.01); *G06F 3/1204* (2013.01); *G06F 3/1205* (2013.01); *G06F 3/1255* (2013.01); *G06F 3/1258* (2013.01); *G06F 3/1271* (2013.01); *H04N 1/00405* (2013.01); *H04N 1/00411* (2013.01); *H04N 1/00413* (2013.01); *H04N 2201/0094* (2013.01)

(58) Field of Classification Search
CPC ........... H04N 1/00424; H04N 1/00405; H04N 1/00411; H04N 1/00413; H04N 2201/0094; G06F 3/1205; G06F 3/1255; G06F 3/1258; G06F 3/1271; G06F 3/1204
See application file for complete search history.

(56) References Cited

U.S. PATENT DOCUMENTS 6,904,568 B2 * 6/2005 Colgrove .............. G06F 3/0482
715/839
8,300,237 B2 10/2012 Sugi
(Continued)

FOREIGN PATENT DOCUMENTS

JP 2009-017340 1/2009
WO 2012/105156 8/2012

OTHER PUBLICATIONS

Extended European Search Report dated Feb. 10, 2017.

*Primary Examiner* — Ming Y Hon
(74) *Attorney, Agent, or Firm* — IPUSA, PLLC

(57) ABSTRACT

An information processing apparatus is provided that includes a memory storing a program, and a processor configured to execute the program to implement a process of determining whether a prohibited setting item is included among a plurality of setting items corresponding to a plurality of display components that are arranged in an image for displaying a setting screen on a display device. The prohibited setting item corresponds to a setting item that is prohibited from being set up in combination with a selected setting item for which a value has been set up in response to an operation made with respect to a selected display component corresponding to the selected setting item. If the prohibited setting item is included among the plurality of setting items, the processor further implements a process of changing the position of a non-configurable display component corresponding to the prohibited setting item within the image.

16 Claims, 24 Drawing Sheets

(56) References Cited

U.S. PATENT DOCUMENTS

| | | | |
|---|---|---|---|
| 2008/0007758 A1* | 1/2008 | Miyashita | G06F 21/629 358/1.14 |
| 2009/0091781 A1* | 4/2009 | Nishimura | G06F 3/1204 358/1.15 |
| 2009/0190153 A1* | 7/2009 | Nakanishi | H04N 1/00411 358/1.13 |
| 2010/0202016 A1* | 8/2010 | Matsuzawa | H04N 1/00233 358/1.15 |
| 2014/0168683 A1* | 6/2014 | Ozaki | G06F 3/1219 358/1.13 |
| 2014/0176997 A1* | 6/2014 | Adachi | G06F 3/1237 358/1.15 |
| 2016/0080600 A1* | 3/2016 | Nishida | H04N 1/00925 358/1.14 |
| 2016/0253071 A1* | 9/2016 | Mishra | G06F 3/04817 715/811 |

* cited by examiner

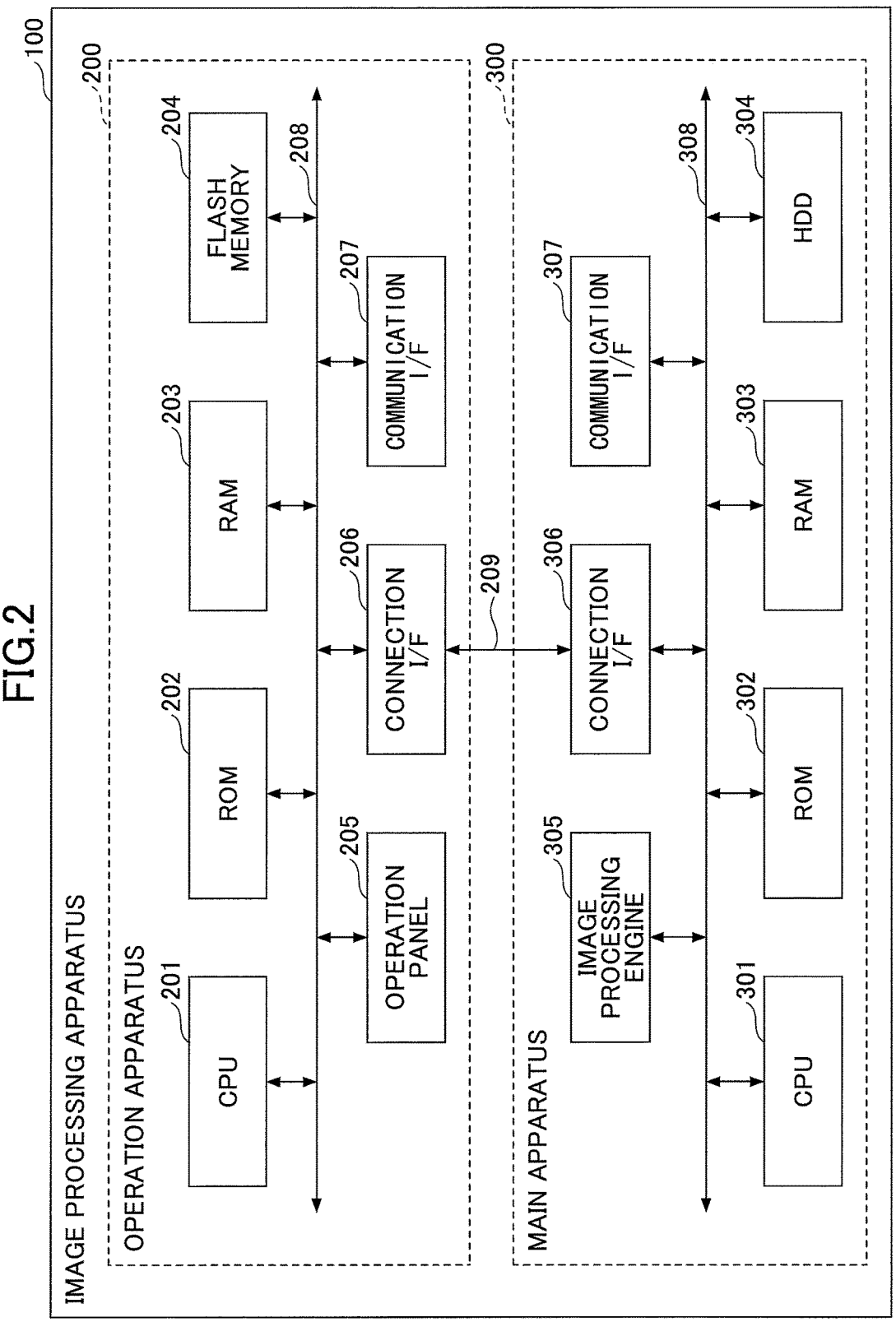

FIG.5

| PROHIBITED CONDITION | | COLOR | | | NUMBER OF COPIES | SORT/STACK | | | | | RESIZE | | | STAPLE | | | | | | HOLE PUNCH | | | | | DIV | BOOKLET | | | | DSD | PR |
|---|---|---|---|---|---|---|---|---|---|---|---|---|---|---|---|---|---|---|---|---|---|---|---|---|---|---|---|---|---|---|---|
| | | AC | BW | FC | # | SO | SH | RS | NO | | PS | PER | NO | UL | ULD | UR | URD | NO | UL1 | L2 | R2 | T2 | NO | DIV | ML | MR | BL | BR | DSD | PR |
| COLOR | AUTO COLOR SELECTION (AC) | | | | | | | | | | | | | | | | | | | | | | | | | | | | | |
| | BLACK & WHITE (BW) | | | | | | | | | | | | | | | | | | | | | | | | | | | | | |
| | FULL COLOR (FC) | | | | | | | | | | | | | | | | | | | | | | | | | | | | | |
| NUMBER OF COPIES | NUMBER (#) | | | | | | | | | | | | | | | | | | | | | | | | | | | | | |
| SORT/STACK | SORT (SO) | | | | | | | | | | | | | | | | | | | | | | | | | | | | | |
| | SHIFT STACK (SH) | | | | | | | | | | | | | | | | | | | | | | | | | | | | | |
| | ROTATE SORT (RS) | | | | | | | | | | | | | | | | | | | | | | | | | | | | | |
| | NONE (NO) | | | | | | | | | | | | | | | | | | | | | | | | | | | | | |
| RESIZE | PAPER/SPECIFY SIZE (PS) | | | | | | | | | | | | | | | | | | | | | | | | | | | | | |
| | SPECIFY PERCENTAGE (%) (PER) | | | | | | | | | | | | | | | | | | | | | | | | | | | | | |
| STAPLE | UPPER LEFT (UL) | | | | | NO | NO | NO | | | | | | | | | | | | | | | | | | | | | | |
| | UPPER LEFT DIAGONAL (ULD) | | | | | NO | NO | NO | | | | | | | | | | | | | | | | | | | | | | |
| | UPPER RIGHT (UR) | | | | | NO | NO | NO | | | | | | | | | | | | | | | | | | | | | | |
| | UPPER RIGHT DIAGONAL (URD) | | | | | NO | NO | NO | | | | | | | | | | | | | | | | | | | | | | |
| | NONE (NO) | | | | | | | | | | | | | | | | | | | | | | | | | | | | | |
| HOLE PUNCH | UPPER LEFT ONE HOLE (UL1) | | | | | NO | | | | | | | | | NO | NO | NO | | | | | | | | | | | | | |
| | LEFT TWO HOLES (L2) | | | | | NO | | | | | | | | | NO | NO | NO | | | | | | | | | | | | | |
| | RIGHT TWO HOLES (R2) | | | | | NO | | | | | | | | NO | NO | | | NO | | | | | | | | | | | | |
| | TOP TWO HOLES (T2) | | | | | NO | | | | | | | | | NO | | | NO | | | | | | | | | | | | |
| | NONE (NO) | | | | | | | | | | | | | | | | | | | | | | | | | | | | | |
| DIVIDE (DIV) | DIVIDE (DIV) | | | | | | | | | | | | | | | | | | | | | | | | | | | | | |
| BOOKLET | MAGAZINE (OPEN TO LEFT) (ML) | | | | | | | | | | | | | NO | NO | NO | NO | | NO | NO | NO | NO | | | | | | | | |
| | MAGAZINE (OPEN TO RIGHT) (MR) | | | | | | | | | | | | | NO | NO | NO | NO | | NO | NO | NO | NO | | | | | | | | |
| | MINI BOOKLET (OPEN TO LEFT) (BL) | | | | | | | | | | | | | NO | NO | NO | NO | | NO | NO | NO | NO | | | | | | | | |
| | MINI BOOKLET (OPEN TO RIGHT) (BR) | | | | | | | | | | | | | NO | NO | NO | NO | | NO | NO | NO | NO | | | | | | | | |
| DOUBLE SPREAD DUPLEX (DSD) | DOUBLE SPREAD DUPLEX (DSD) | | | | | | | | | | | | | | | | | | | | | | | | NO | NO | NO | NO | NO | | |
| PRINT (PR) | PRINT (PR) | | | | | | | | | | | | | | | | | | | | | | | | | | | | | | |

| ORDER | SETTING ITEM | SELECTABILITY |
|---|---|---|
| 1 | COLOR | O |
| 2 | PERCENTAGE | O |
| 3 | NUMBER OF COPIES | O |
| 4 | STAPLE | O |
| 5 | HOLE PUNCH | O |
| 6 | SORT | O |
| 7 | DIVIDE | O |
| 8 | BOOKLET | O |
| 9 | DOUBLE SPREAD | O |
| 10 | PRINT | O |
| 11 | COMBINE | O |
| 12 | EXTERNAL PAPER SUPPLY | O |

| ORDER | SETTING ITEM | SELECTABILITY |
|---|---|---|
| 1 | COLOR | ○ |
| 2 | PERCENTAGE | ○ |
| 3 | NUMBER OF COPIES | ○ |
| 4 | STAPLE | ○ |
| 5 | HOLE PUNCH | ○ |
| 6 | SORT | ○ |
| 7 | DIVIDE | ○ |
| 8 | BOOKLET | ○ |
| 9 | DOUBLE SPREAD | ○ |
| 10 | PRINT | ○ |
| 11 | COMBINE | ○ |
| 12 | EXTERNAL PAPER SUPPLY | ○ |

| ORDER | SETTING ITEM | SELECTABILITY |
|---|---|---|
| 1 | COLOR | ○ |
| 2 | PERCENTAGE | ○ |
| 3 | NUMBER OF COPIES | ○ |
| 4 | STAPLE | ○ |
| 5 | SORT | ○ |
| 6 | DIVIDE | ○ |
| 7 | DOUBLE SPREAD | ○ |
| 8 | PRINT | ○ |
| 9 | COMBINE | ○ |
| 10 | EXTERNAL PAPER SUPPLY | ○ |
| 11 | HOLE PUNCH | × |
| 12 | BOOKLET | × |

| ORDER | SETTING ITEM | SELECTABILITY | DISPLAYABILITY |
|---|---|---|---|
| 1 | COLOR | ○ | ○ |
| 2 | PERCENTAGE | ○ | ○ |
| 3 | NUMBER OF COPIES | ○ | ○ |
| 4 | STAPLE | ○ | ○ |
| 5 | HOLE PUNCH | ○ | ○ |
| 6 | SORT | ○ | ○ |
| 7 | DIVIDE | ○ | ○ |
| 8 | BOOKLET | ○ | ○ |
| 9 | DOUBLE SPREAD | ○ | ○ |
| 10 | PRINT | ○ | ○ |
| 11 | COMBINE | ○ | ○ |
| 12 | EXTERNAL PAPER SUPPLY | ○ | × |

262A

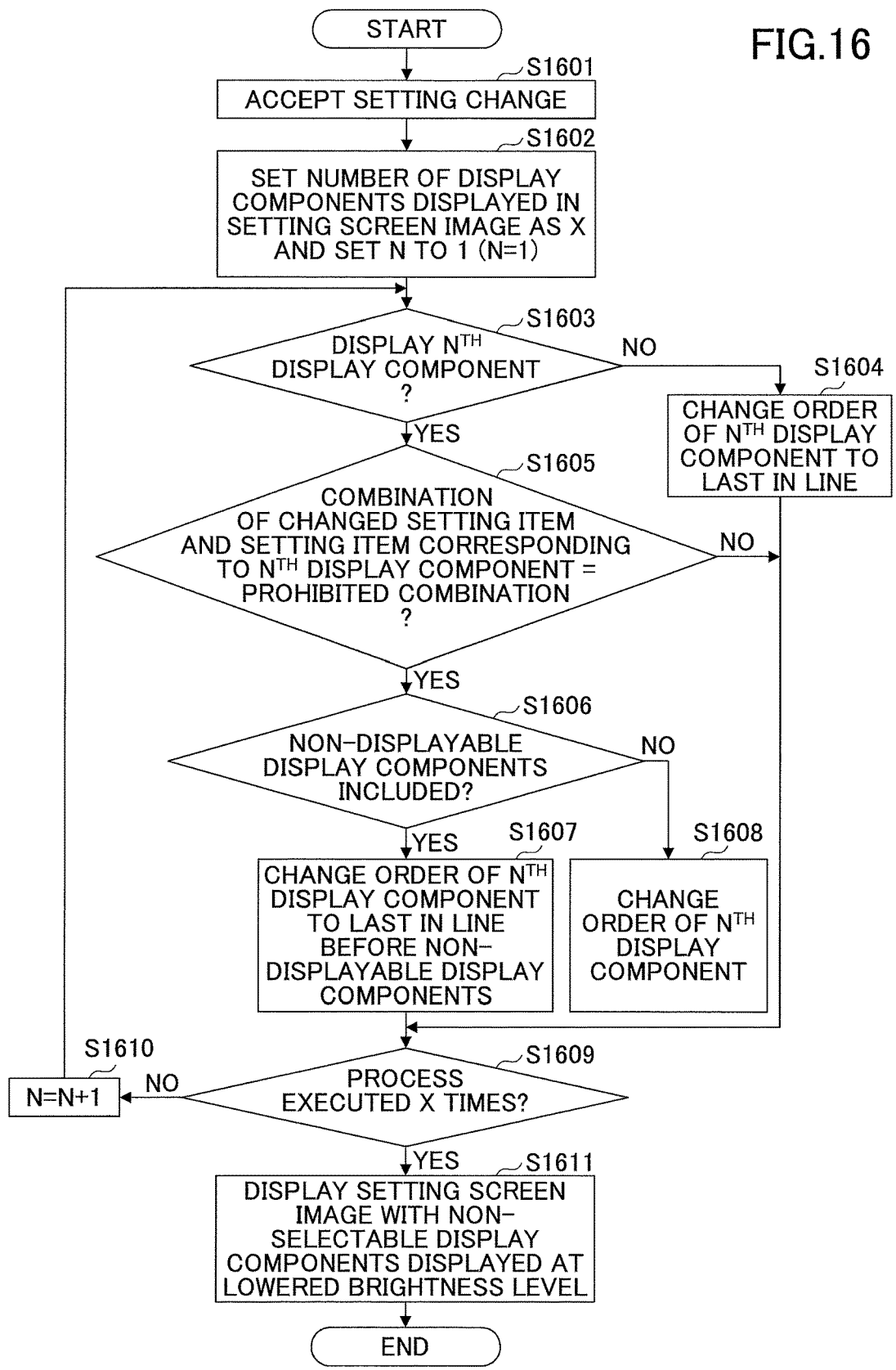

| ORDER | SETTING ITEM | SELECTABILITY | DISPLAYABILITY |
|---|---|---|---|
| 1 | COLOR | ○ | ○ |
| 2 | PERCENTAGE | ○ | ○ |
| 3 | NUMBER OF COPIES | ○ | ○ |
| 4 | STAPLE | ○ | ○ |
| 5 | HOLE PUNCH | ○ | ○ |
| 6 | SORT | ○ | ○ |
| 7 | DIVIDE | ○ | ○ |
| 8 | BOOKLET | ○ | ○ |
| 9 | DOUBLE SPREAD | ○ | ○ |
| 10 | PRINT | ○ | ○ |
| 11 | COMBINE | ○ | ○ |
| 12 | EXTERNAL PAPER SUPPLY | ○ | × |

FIG.17B 262A-1

| ORDER | SETTING ITEM | SELECTABILITY | DISPLAYABILITY |
|---|---|---|---|
| 1 | COLOR | ○ | ○ |
| 2 | PERCENTAGE | ○ | ○ |
| 3 | NUMBER OF COPIES | ○ | ○ |
| 4 | STAPLE | ○ | ○ |
| 5 | SORT | ○ | ○ |
| 6 | DIVIDE | ○ | ○ |
| 7 | DOUBLE SPREAD | ○ | ○ |
| 8 | PRINT | ○ | ○ |
| 9 | COMBINE | ○ | ○ |
| 10 | HOLE PUNCH | × | ○ |
| 11 | BOOKLET | × | ○ |
| 12 | EXTERNAL PAPER SUPPLY | ○ | × |

FIG.21

| ORDER | SETTING ITEM | SELECTABILITY | DISPLAYABILITY | MOVABILITY |
|---|---|---|---|---|
| 1 | COLOR | ○ | ○ | × |
| 2 | PERCENTAGE | ○ | ○ | × |
| 3 | NUMBER OF COPIES | ○ | ○ | × |
| 4 | STAPLE | ○ | ○ | ○ |
| 5 | HOLE PUNCH | ○ | ○ | × |
| 6 | SORT | ○ | ○ | ○ |
| 7 | DIVIDE | ○ | ○ | ○ |
| 8 | BOOKLET | ○ | ○ | ○ |
| 9 | DOUBLE SPREAD | ○ | ○ | ○ |
| 10 | PRINT | ○ | ○ | ○ |
| 11 | COMBINE | ○ | ○ | ○ |
| 12 | EXTERNAL PAPER SUPPLY | ○ | × | ○ |

| ORDER | SETTING ITEM | SELECTABILITY | DISPLAYABILITY | MOVABILITY 262B |
|---|---|---|---|---|
| 1 | COLOR | ○ | ○ | × |
| 2 | PERCENTAGE | ○ | ○ | × |
| 3 | NUMBER OF COPIES | ○ | ○ | × |
| 4 | STAPLE | ○ | ○ | ○ |
| 5 | HOLE PUNCH | ○ | ○ | × |
| 6 | SORT | ○ | ○ | ○ |
| 7 | DIVIDE | ○ | ○ | ○ |
| 8 | BOOKLET | ○ | ○ | ○ |
| 9 | DOUBLE SPREAD | ○ | ○ | ○ |
| 10 | PRINT | ○ | ○ | ○ |
| 11 | COMBINE | ○ | ○ | ○ |
| 12 | EXTERNAL PAPER SUPPLY | ○ | × | ○ |

FIG.23B

| ORDER | SETTING ITEM | SELECTABILITY | DISPLAYABILITY | MOVABILITY |
|---|---|---|---|---|
| 1 | COLOR | ○ | ○ | × |
| 2 | PERCENTAGE | ○ | ○ | × |
| 3 | NUMBER OF COPIES | ○ | ○ | × |
| 4 | STAPLE | × | ○ | ○ |
| 5 | HOLE PUNCH | ○ | ○ | × |
| 6 | SORT | ○ | ○ | ○ |
| 7 | DIVIDE | ○ | ○ | ○ |
| 8 | DOUBLE SPREAD | ○ | ○ | ○ |
| 9 | PRINT | ○ | ○ | ○ |
| 10 | COMBINE | × | ○ | ○ |
| 11 | BOOKLET | ○ | ○ | ○ |
| 12 | EXTERNAL PAPER SUPPLY | | × | ○ |

262B-1

ND_PROCESSING_APPARATUS
INFORMATION PROCESSING APPARATUS HAVING IMPROVED OPERABILITY OF SETTING SCREEN AND INFORMATION PROCESSING METHOD THEREFOR

CROSS-REFERENCE TO RELATED APPLICATIONS

The present application claims priority under 35 U.S.C. § 119 to Japanese Patent Application No. 2015-182046 filed on Sep. 15, 2015, the entire contents of which are incorporated herein by reference.

BACKGROUND OF THE INVENTION

1. Field of the Invention

The present invention relates to an information processing apparatus and an information processing method.

2. Description of the Related Art

Techniques are known for displaying a setting screen on a touch panel of an image processing apparatus to enable a user to configure various settings by operating display components corresponding to setting items, for example.

Also, when a specific setting value is set up, other setting values may not be set up in combination with the specific setting value. Thus, techniques are known for displaying buttons corresponding to the other setting values at half the brightness level as compared with the brightness level at which the button corresponding to the specific setting value is displayed (see e.g., Japanese Unexamined Patent Publication No. 2009-17340).

SUMMARY OF THE INVENTION

According to one embodiment of the present invention, an information processing apparatus is provided that includes a memory storing a program, and a processor configured to execute the program to implement a process of determining whether a prohibited setting item is included among a plurality of setting items corresponding to a plurality of display components that are arranged in an image for displaying a setting screen on a display device. The prohibited setting item corresponds to a setting item that is prohibited from being set up in combination with a selected setting item for which a value has been set up in response to an operation made with respect to a selected display component corresponding to the selected setting item. If the prohibited setting item is included among the plurality of setting items, the processor further implements a process of changing the position of a non-configurable display component corresponding to the prohibited setting item within the image.

BRIEF DESCRIPTION OF THE DRAWINGS

FIG. 2 is a block diagram illustrating an example hardware configuration of an image processing apparatus;

FIG. 5 illustrates an example of a prohibited condition table;

FIG. 6 illustrates an example of a layout management table according to the first embodiment;

FIGS. 8A and 8B illustrate an example case of updating the layout management table according to the first embodiment;

FIG. 15 illustrates an example of the layout management table according to the second embodiment;

FIG. 16 is a flowchart illustrating an operation of the display control process unit according to the second embodiment;

FIGS. 17A and 17B illustrate an example case of updating the layout management table according to the second embodiment;

FIG. 21 is a diagram showing an example of the layout management table according to the third embodiment;

FIGS. 23A and 23B illustrate an example case of updating the layout management table according to the third embodiment.

DESCRIPTION OF EMBODIMENTS

According to one aspect of the present invention, a technique is provided for improving operability of a setting screen.

Example embodiments of the present invention are described below with reference to the accompanying drawings.

First Embodiment

Figure 1A:
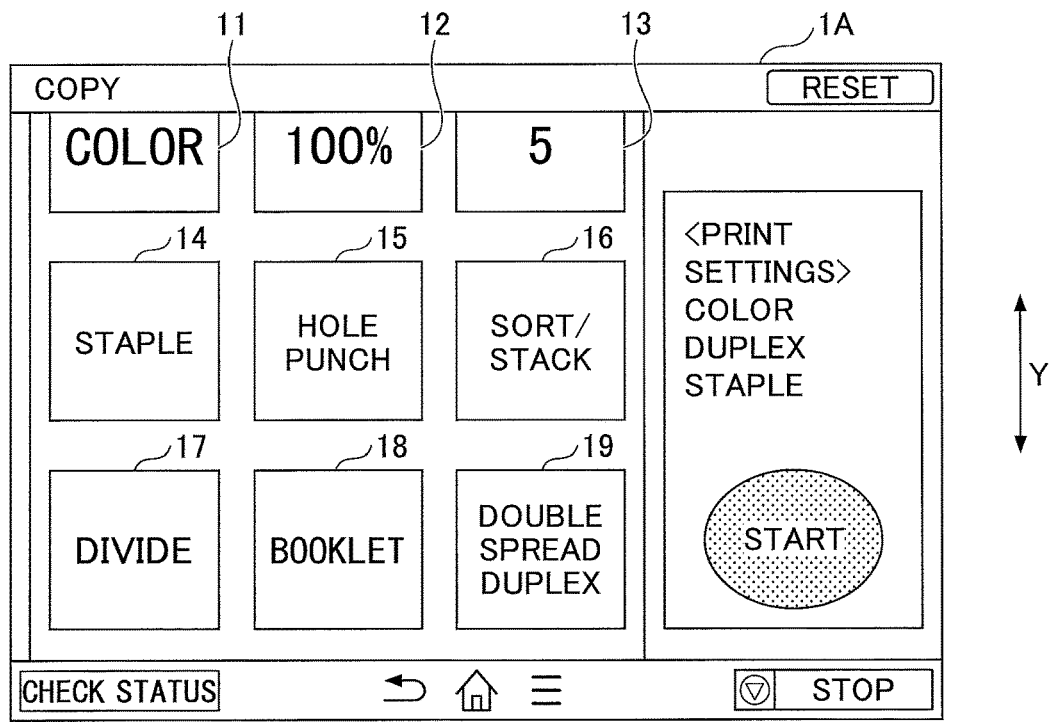
FIGS. 1A and 1B are diagrams illustrating example setting screens.
Figure 1B:
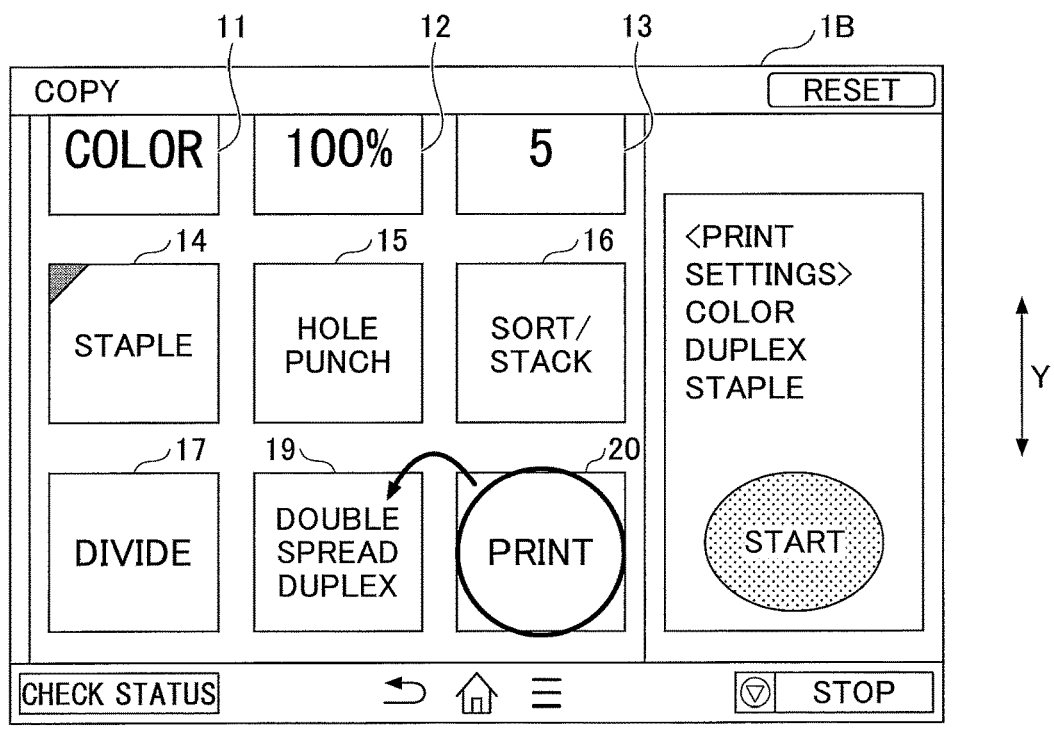

In the following, a first embodiment of the present invention is described. FIGS. 1A and 1B illustrate example setting screens according to the first embodiment. FIG. 1A illustrates a setting screen 1A, and FIG. 1B illustrates a setting screen 1B.

The setting screen 1A of FIG. 1A and the setting screen 1B of FIG. 1B may be displayed on an operation panel of an image processing apparatus, for example.

The setting screens 1A and 1B are display screens that are displayed by controlling the operation panel to display corresponding setting screen images. The setting screen images for displaying the setting screens 1A and 1B include display components 11-19 that correspond to setting items for a copy function implemented by the image processing apparatus.

In the setting screen 1A, parts of the display components 11-13 and the display components 14-19 are displayed. When a scrolling operation in the direction of arrow Y at the right side of FIG. 1A is accepted while the setting screen 1A is displayed, the display area of the setting screen image displayed on the operation panel may be scrolled up or down and display components according to the position of the display area of the operation panel may be displayed. Note that the setting screen image may include display components other than the display components 11-19 that are displayed on the setting screen 1A of FIG. 1A.

Thus, when the setting screen image is scrolled while the setting screen 1A is displayed, display components other than the display components 11-19 may be displayed on the setting screen displayed on the operation panel.

According to an aspect of the present embodiment, when a value is set up for a selected setting item, a determination is made as to whether there is a setting item (prohibited setting item) that is prohibited from being set up in combination with the selected setting item. If such a prohibited setting item exists, the position of a display component corresponding to the prohibited setting item within the setting screen image is moved to the end of the display components arranged in the setting screen image.

For example, a value for the setting item "staple" and a value for the setting item "booklet" are prohibited from being set up at the same time.

Thus, in the present embodiment, when the display component 14 corresponding to the setting item "staple" is operated at the setting screen 1A and a value indicating that stapling is to be performed is set up, for example, the setting screen 1A is controlled to refrain from accepting an operation with respect to the display component 18 corresponding to the setting item "booklet".

In this case, the setting screen 1A transitions to the setting screen 1B as illustrated in FIG. 1B. The setting screen 1B does not display the display component 18 corresponding to the prohibited setting item "booklet" for which a value cannot be set up in combination with the setting item "staple".

That is, the position of the display component 18 within the setting screen image is moved to the end of the display components arranged within the setting screen image. Thus, the position of the display component 18 within the setting screen image falls out of the display area of the setting screen image displayed by the operation panel, and as a result, the display component 18 is not displayed in the setting screen 1B.

In the setting screen 1B, the display component 19 is displayed at the position where the display component 18 was originally displayed (in the setting screen 1A), and a display component 20 is displayed at the position where the display component 19 was originally displayed. Note that the display component 20 is a display component that was not displayed in the setting screen 1A.

As can be appreciated, in the present embodiment, when a given display component is moved to the end of the display components arranged within the setting screen image, the positions of the display components previously positioned after the given display component are moved up to fill the vacated position of the given display component that has been moved to the end.

That is, in a setting screen image according to the present embodiment, a display component corresponding to a prohibited setting item for which a value cannot be set up is positioned after display components corresponding to setting items (non-prohibited setting items) for which values can be set up.

Thus, according to an aspect of the present embodiment, one or more display components corresponding to prohibited setting items for which values cannot be set up may be prevented from being intermixed with display components corresponding to non-prohibited setting items for which values can be set up. Note that in the following descriptions, a display component corresponding to a non-prohibited setting item for which a value can be set up is referred to as "configurable display component", and a display component corresponding to a prohibited setting item for which a value cannot be set up is referred to as "non-configurable setting item".

Also, according to an aspect of the present embodiment, even when configurable display components and one or more non-configurable display components are displayed on a setting screen at the same time, the non-configurable display components are displayed after the configurable display components. In this way, a setting screen according to the present embodiment may be prevented from displaying configurable display components intermixed with non-configurable display components. That is, a setting screen according to the present embodiment may be prevented from alternately displaying a configurable display component and a non-configurable display component, or displaying a non-configurable display component in the middle of series of configurable display components, for example.

Thus, according to an aspect of the present embodiment, operations on the configurable display components may be easily performed and operability may be improved.

In the following, an image processing apparatus 100 according to the present embodiment is described. FIG. 2 is a block diagram illustrating an example hardware configuration of the image processing apparatus 100 according to the present embodiment.

The image processing apparatus 100 according to the present embodiment is a multifunctional peripheral (MFP) including multiple functions, such as a copy function, a scan function, a fax function, an image processing function, and a printer function, for example.

As illustrated in FIG. 2, the image processing apparatus 100 includes an operation apparatus 200 and a main apparatus 300.

The operation apparatus 200 is used by a user to perform various operations, such as selecting an image processing function to be implemented by the main apparatus 300, inputting various setting values for implementing the image processing function, inputting an instruction to execute a process for implementing the image processing function, or switching a display screen, for example.

The main apparatus 300 executes various processes for implementing an image processing function in response to various operations made by the user using the operation apparatus 200, for example. The main apparatus 300 also sends requests to the operation apparatus 200 for displaying various messages.

The operation apparatus 200 of the embodiment includes a CPU (Central Processing Unit) 201, a ROM (Read Only Memory) 202, and a RAM (Random Access Memory) 203.

Further, the operation apparatus 200 includes a flash memory 204, an operation panel 205, a connection I/F 206, and a communication I/F 207. These hardware elements are connected to each other via a bus 208.

The CPU 201 is a computing unit (processor) that controls the entire operation apparatus 200 by executing various programs stored in the ROM 202 or the flash memory 204 using the RAM 203 as a working area.

The ROM 202 is a non-volatile semiconductor memory (storage device) capable of holding data even when the power is turned off. The RAM 203 is a volatile semiconductor memory (storage device) for temporarily storing programs and data.

The flash memory 204 is a non-volatile storage medium storing various programs to be executed by the CPU 201 (e.g., a program for implementing the present embodiment) and various data.

The operation panel 205 may be a touch panel, for example, and is used by the user to perform various operations. Further, the operation panel 205 displays various messages. That is, the operation panel 205 may display a GUI (Graphical User Interface) display screen for enabling the user to perform various operations for implementing various functions of the image processing apparatus 100 and information relating to the processing result of the image processing apparatus 100 (e.g., error message, guidance message).

The connection I/F 206 is an interface for establishing communication with the main apparatus 300 via a communication path 209. The connection I/F 206 may be an interface conforming to the USB (Universal Serial Bus) standard, for example.

The communication I/F 207 is an interface for establishing communication with other devices. The communication I/F 207 may be wireless LAN conforming to the Wi-Fi standard, for example.

The main apparatus 300 of the present embodiment includes a CPU 301, a ROM 302, and a RAM 303. The main apparatus 300 also includes a HDD (Hard Disk Drive) 304, an image processing engine 305, a connection I/F 306, and a communication I/F 307. These hardware elements are connected to each other via a bus 308.

The CPU 301 is a computing unit (processor) that controls the entire main apparatus 300 by executing various programs stored in the ROM 302 or the HDD 304 using the RAM 303 as a working area.

The ROM 302 is a non-volatile semiconductor memory (storage device) capable of holding data even when the power is turned off. The RAM 303 is a volatile semiconductor memory (storage device) for temporarily storing programs and data.

The HDD 304 is a non-volatile storage medium storing various programs to be executed by the CPU 301 (e.g., a program for implementing the present embodiment) and various data.

The image processing engine 305 is hardware for performing image processes for implementing various image processing functions, such as a copy function, a scan function, a fax function, and a printer function, for example.

The image processing engine 305 may include a scanner that generates image data by optically scanning a document, a plotter that prints an image on sheet material such as paper, and facsimile communication device for performing facsimile communication, for example. Further, the image processing engine 305 may include a finisher that sorts printed sheets and/or an ADF (automatic document feeder) that automatically feeds a document, for example.

The connection I/F 306 is an interface for establishing communication with the operation apparatus 200 via the communication path 209. The connection I/F 306 may be an interface conforming to the USB standard, for example.

The communication I/F 307 is an interface for establishing communication with other devices. The communication I/F 307 may be a wireless LAN conforming to the Wi-Fi standard, for example.

The image processing apparatus 100 according to the present embodiment may implement various processes as described below using the above-described hardware elements.

Note that although FIG. 2 illustrates a configuration in which the image processing apparatus 100 includes the operation apparatus 200, the present invention is not limited thereto. In other examples, an information processing terminal, such as a tablet terminal, a smart phone, a mobile phone, or a PDA (personal digital assistant) may be used as the operation apparatus 200. That is, such information processing terminal may be configured to control the image forming apparatus 100 by communicating with the image processing apparatus 100 via the communication I/F 207 of the operation apparatus 200 or the communication I/F 307 of the main apparatus 300, for example.

Figure 3:
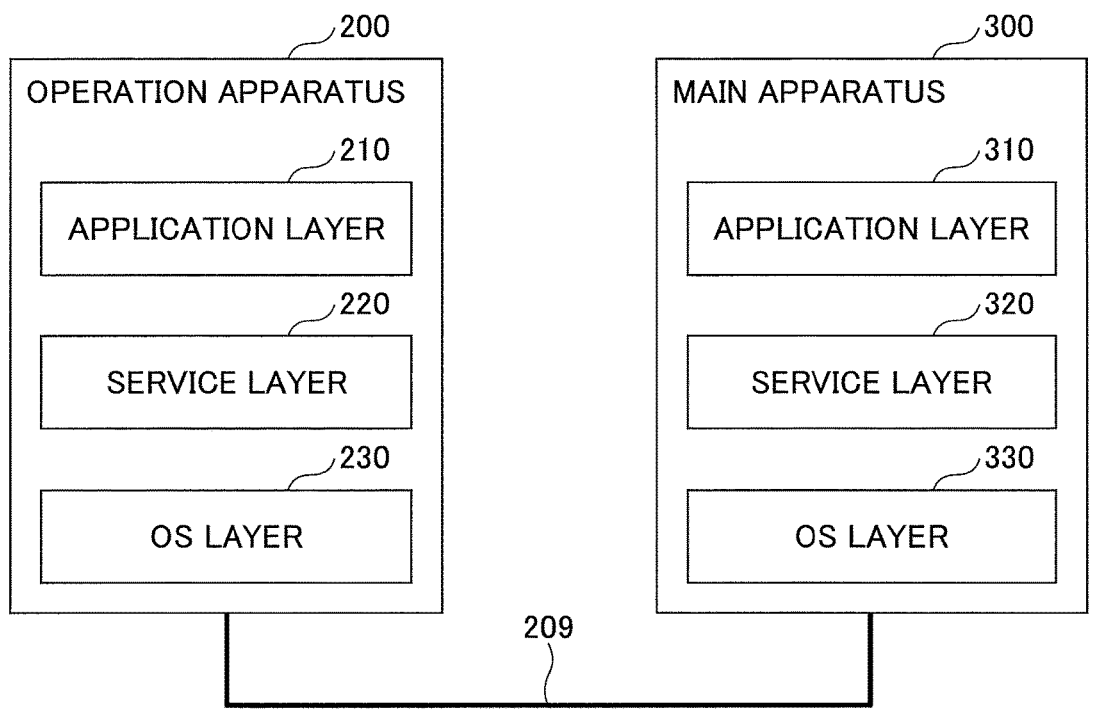
FIG. 3 is a diagram illustrating hierarchical structures of groups of programs included in an operation apparatus and a main apparatus of the image processing apparatus.

In the following, referring to FIG. 3, the hierarchical structures of groups of programs included in the operation apparatus 200 and the main apparatus 300 of the image processing apparatus 100 are be described. FIG. 3 is a diagram illustrating example hierarchical structures of groups of programs included in the operation apparatus 200 and the main apparatus 300 of the image processing apparatus 100.

FIG. 3 illustrates the hierarchical structure of a group of programs included in the operation apparatus 200, and the hierarchical structure of a group of programs included in the main apparatus 300.

The group of programs included in the operation apparatus 200 may be stored in the ROM 202, or the flash memory 204, for example. The group of programs included in the main apparatus 300 may be stored in the ROM 302 or the HDD 304, for example.

First, the hierarchical structure of the group of programs included in the main apparatus 300 is described below. The group of programs included in the main apparatus 300 can be roughly divided into an application layer 310, a service layer 320, and an OS (Operating System) layer 330.

A program categorized into the application layer 310 is a program for implementing an image processing function by operating hardware resources of the main apparatus 300. Specific examples of such a program include a copy application, a scan application, a fax application, and a printer application.

A program categorized into the service layer 320 is a program that is interposed between the application layer 310 and the OS layer 330. Such a program may implement the functions of an interface for enabling a program of the application layer 310 to use the hardware resources of the main apparatus 300 and/or providing notification of the status of the hardware resources of the main apparatus 300, for example.

Specifically, a program of the service layer 320 may accept an operation request directed to a hardware resource of the main apparatus 300 and act as an intermediary for the accepted operation request. Also, a program of the service layer 320 may send error information relating to an error detected in a hardware resource. Note that an operation request accepted by the service layer 320 may include, for example, an operation request for an image process to be implemented by the image process engine 305 (e.g., operation request for a scanning operation by a scanner, operation request for a printing operation by a plotter).

Note that a program categorized into the service layer 320 may similarly act as an interface with respect to the application layer 210 of the operation apparatus 200. That is, a program categorized into the application layer 210 of the operating device 200 may access the service layer 320 to operate the hardware resources of the main apparatus 300 and implement an image processing function.

A program categorized into the OS layer 330 is a program referred to as basic software, which provides basic functions for controlling the hardware resources of the main apparatus 300. A program categorized into the OS layer 330 accepts an operation request for operating a hardware resource from a program categorized into the application layer 310 via a program categorized into the service layer 320, and executes a process corresponding to the operation request. Also, by executing a program categorized into the OS layer 330, an error detected in hardware resources may be received by the program of the OS layer 330 and passed to the service layer 320 as the error information.

Next, the hierarchical structure of the group of programs included in the operation apparatus 200 is described below. As with the main apparatus 300, the group of programs included in the operation apparatus 200 can also be roughly divided into an application layer 210, a service layer 220 and an OS layer 230.

However, functions provided by a program categorized into the application layer 210 of the operation apparatus 200 are different from the functions provided by a program of the application layer 310 of the main apparatus 300, and the types operation requests that can be accepted by a program categorized into the service layer 220 are different from those accepted by the service layer 320 of the main apparatus 300. A program categorized into the application layer 210 of the operation apparatus 200 mainly provides a user interface function for accepting various operations and displaying information.

In the present embodiment, it is assumed that the OS of the operation apparatus 200 and the OS of the main apparatus 300 operate independently. Also, note that the OS of the operation apparatus 200 and the OS of the main apparatus 300 do not have to be the same type of OS as long as the operation apparatus 200 and the main apparatus 300 are able to communicate with each other. For example, the operation apparatus 200 may use Android (registered trademark) as its OS while the main apparatus 300 may use Linux (registered trademark) as its OS.

That is, the image processing apparatus 100 may be a system including the operation apparatus 200 and the main apparatus 300 that are controlled by different operating systems. In this case, communication between the operation apparatus 200 and the main apparatus 300 would not be an inter-process communication within a single information processing apparatus but instead be communication between different information processing apparatuses. For example, such communication may be implemented when the operation apparatus 200 transmits operation information indicating various operations of a user accepted by the operation apparatus 200 to the main apparatus 300, and when the main apparatus 300 transmits a display request to the operation apparatus 200 for requesting the display of a display screen.

However, the image processing apparatus 100 of the present embodiment is not limited to a configuration in which different types of operating systems are used in the operation apparatus 200 and the main apparatus 300. That is, the present embodiment encompasses configurations in which the same type of OS is used in the operation apparatus 200 and the main apparatus 300. Further, the image processing apparatus 100 of the present embodiment is not limited to a configuration in which the OS of the operation apparatus 200 and the OS of the main apparatus 300 operate independently. That is, one OS may be operating on the operating device 200 and the main apparatus 300, for example.

In the image processing apparatus 100 according to the present embodiment, the operation apparatus 200 performs operations for displaying and controlling the display of a setting screen as illustrated in FIGS. 1A and 1B, for example.

Figure 4:
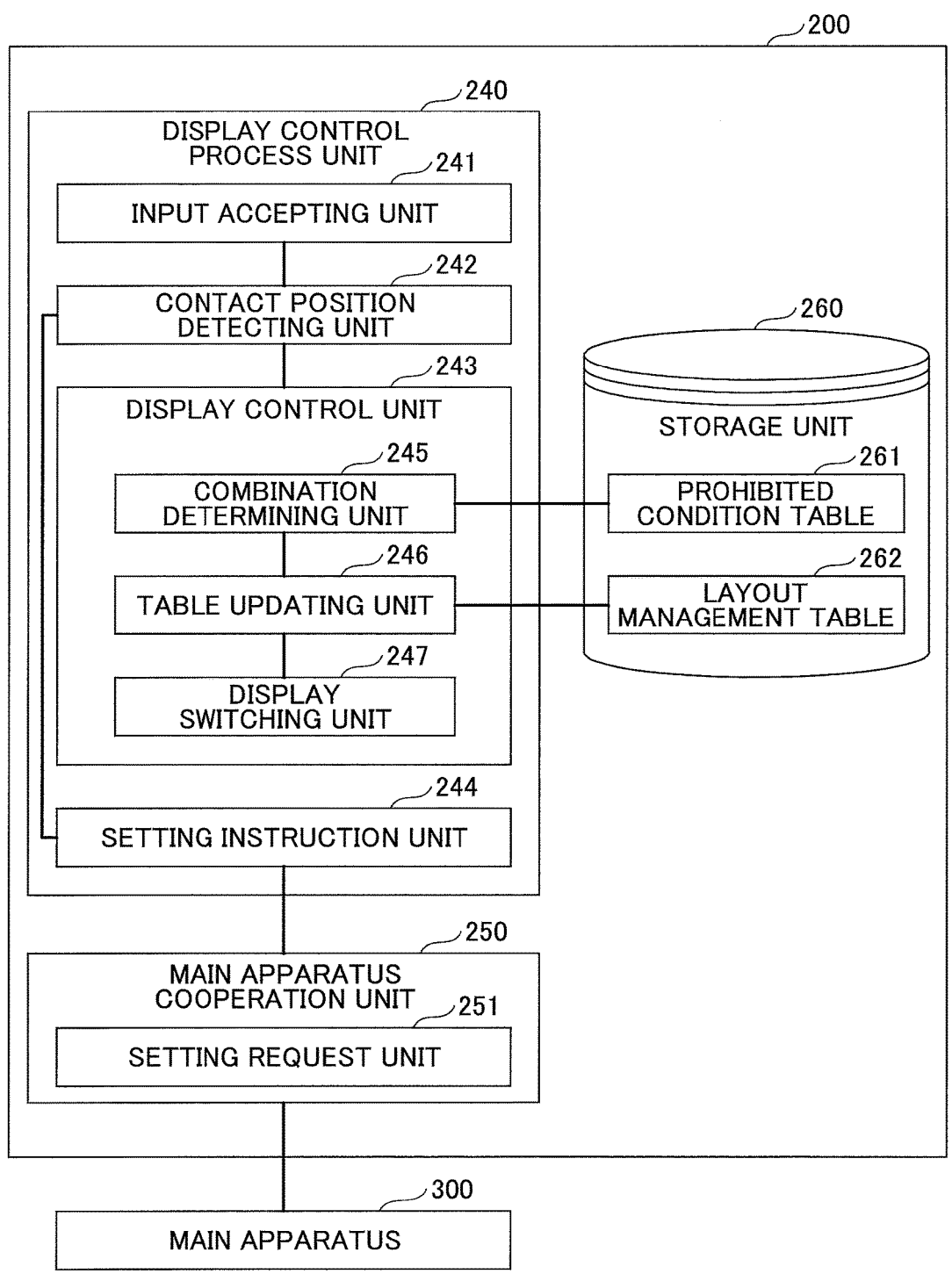
FIG. 4 is a block diagram illustrating an example functional configuration of the operation apparatus according to a first embodiment of the present invention.

In the following, the functional configuration of the operation apparatus 200 is described. FIG. 4 is a block diagram illustrating an example functional configuration of the operation apparatus 200 according to the present embodiment. Note that functional elements of the operation apparatus 200 that are described below may be implemented by the CPU 201 executing a program categorized into the application layer 210, for example.

The operation apparatus 200 according to the present embodiment includes a display control process unit 240, a main apparatus cooperation unit 250, and a storage unit 260.

The display control process unit 240 of the present embodiment accepts an operation on the operation panel 205, and displays a corresponding screen in response to the operation. Further, the display control processing unit 240 of the present embodiment controls the display of a setting screen for configuring settings relating to functions of the main apparatus 300 (image processing apparatus 100).

The main apparatus cooperation unit 250 sends various process execution requests to the main apparatus 300 according to the operation performed at the operation apparatus 200. Note that the display control process unit 240 and the main apparatus cooperation unit 250 are described in detail below.

The storage unit 260 stores a prohibited condition table 261 and a layout management table 262. The prohibited condition table 261 indicates, for each setting item, one or more prohibited setting items that are prohibited from being set up in combination with the setting item. The layout management table 262 is for managing the layout of the display components arranged in the setting screen image. Note that the above tables stored in the storage unit 260 are described in detail below. The storage unit 260 according to the present embodiment may also store images of the display components in addition to the above-described tables, for example.

In the following, the display control process unit 240 of the present embodiment is described. The display control process unit 240 of the present embodiment includes an input accepting unit 241, a contact position detecting unit 242, a display control unit 243, and a setting instruction unit 244.

The input accepting unit 241 accepts an input to the operation apparatus 200. Specifically, the input accepting unit 241 may detect a contact made with the setting screen displayed on the operation panel 205 and/or an operation with respect to an operation element of the operation apparatus 200, for example.

The contact position detecting unit 242 accepts a contact made on the operation panel 205, and detects a contact position of the contact. Specifically, upon accepting an operation with respect to the setting screen, the contact position detecting unit 242 detects the position within the operation panel 205 at which the operation has been accepted, i.e., the position touched by the user. In the present embodiment, the contact position detected by the contact position detecting unit 242 is used to determine the specific display component within the setting screen that has been operated.

The display control unit 243 updates the layout management table 262 based on the prohibited condition table 261, and controls the display of the setting screen such that display components corresponding to various setting items are displayed in the order specified by the layout management table 262. Note that the display control unit 243 is described in detail below.

The setting instruction unit 244 sends a setting instruction to the main apparatus cooperation unit 250 to set up a selected value that has been selected via the setting screen displayed on the operation panel 205 or a detailed setting screen, which is described below.

In the following, the display control unit 243 is described.

The display control unit 243 of the present embodiment includes a combination determining unit 245, a table updating unit 246, and a display switching unit 247.

The combination determining unit 245 of the present embodiment refers to the prohibited condition table 261, and when a value is set up for a selected setting item via the setting screen, the combination determining unit 245 determines whether there is a setting item (prohibited setting item) that cannot be set up in combination with the selected setting item for which a value has been set up.

The table updating unit 246 of the present embodiment updates the order of the display components listed in the layout management table 262 according to the result of the determination made by the combination determining unit 245.

Specifically, the table updating unit 246 updates the layout management table 262 such that display components corresponding to prohibited setting items are listed after display components corresponding to non-prohibited setting items for which values can be set up in combination with the selected setting item. In other words, the table updating unit 246 changes the order of the display components listed in the layout management table 262 such that non-configurable display components that are prohibited from accepting value setting operations will be displayed after configurable display components that can accept value setting operations via the setting screen. Note that the non-configurable display components that are prohibited from accepting value setting operations correspond to non-selectable display components.

The display switching unit 247 of the present embodiment displays a setting screen having display components corresponding to various setting items arranged according to the order in which the setting items corresponding to the display components are listed in the layout management table 262. Also, the display switching unit 247 of the present embodiment controls the setting screen to display non-configurable display components that are specified as non-selectable in the layout management table 262 in a display mode differs from the display mode used to display the configurable display components that can be selected.

Specifically, the display switching unit 247 controls the display of the display components such that the non-selectable display components are displayed at a lower brightness level as compared with the brightness level at which the selectable display components are displayed.

In the following, the main apparatus cooperation unit 250 is described.

The main apparatus cooperation unit 250 of the present embodiment includes a setting request unit 251. The setting request unit 251 of the present embodiment sends a setting request to the main apparatus 300 upon receiving a setting instruction and a value for a setting item from the setting instruction unit 244.

In the following, the prohibited condition table 261 according to the present embodiment is described with reference to FIG. 5. FIG. 5 illustrates an example of the prohibited condition table 261 according to the present embodiment.

The prohibited condition table 261 of FIG. 5 indicates, for each setting item, one or more prohibited setting items for which a value cannot be set up in combination with the setting item.

Note that a prohibited combination refers to a combination of setting items for which values cannot be set up at the same time. That is, when a value for one of the setting items is set up, a value for the other setting item cannot be set up.

For example, in the prohibited condition table 261 of FIG. 5, the value "NO" is indicated in cells representing prohibited combinations of values for the setting item "staple" and values for the setting item "booklet". That is, according to the prohibited condition table 261 of FIG. 5, a value (except "none") for the setting item "staple" is prohibited from being set up in combination with a value for the setting item "booklet".

Also, in the prohibited condition table 261 of FIG. 5, the value "NO" is indicated in cells representing prohibited combinations of the value "upper left diagonal" for the setting item "staple" and values for the setting item "hole punch". That is, according to the prohibited condition table 261 of FIG. 5, when the value "upper left diagonal" is set up for the setting item "staple", a value (except "none") is prohibited from being set up for the setting item "hole punch".

Also, note that in the prohibited condition table 261 of FIG. 5, no value is indicated in cells representing combinations of values for setting items that can be set up at the same time. For example, the cells representing combinations of values for the setting item "resize" and values for the setting item "booklet" are empty (no value). Thus, according to the prohibited condition table 261 of FIG. 5, values may be set up for the setting item "resize" and the setting item "booklet" at the same time.

In the prohibited condition table 261 of FIG. 5, empty cells represent combinations of values for setting items that can be set up at the same time, and cells including the value "NO" represent prohibited combinations of values for setting items that cannot be set up at the same time. However, embodiments of the present invention are not limited thereto. That is, the prohibited condition table 261 may be arranged to have other various configurations as long as it can distinguish prohibited combinations of values for setting items from combinations of values for setting items that are allowed.

Also, note that the setting items listed in the prohibited condition table 261 of FIG. 5 may be a part of setting items for the image processing apparatus 100, for example.

In the following, the layout management table 262 according to the present embodiment is described with reference to FIG. 6. FIG. 6 illustrates an example of the layout management table 262 according to the first embodiment.

The layout management table 262 of the present embodiment includes the information items "order", "setting item", and "selectability".

The value for the information item "order" indicates the order in which the display components corresponding to setting items are to be arranged on the setting screen. In the present embodiment, the display components corresponding to the setting items are arranged on the setting screen in ascending order based on the values indicating the "order" of the display components in the layout management table 262. Note that the order in which the display components are arranged on the setting screen is described in detail below.

The value for the information item "setting item" indicates a specific setting item. The value for the information item "selectability" indicates whether the display component corresponding to the setting item can be selected. In other words, the value of the information item "selectability" indicates whether the display component corresponding to the setting item corresponds to a configurable display component or a non-configurable display component.

In the present embodiment, the value for the information item "order" and the value for the information item "selectability" are updated by the table updating unit 246 of the display control process unit 240.

Figure 7:
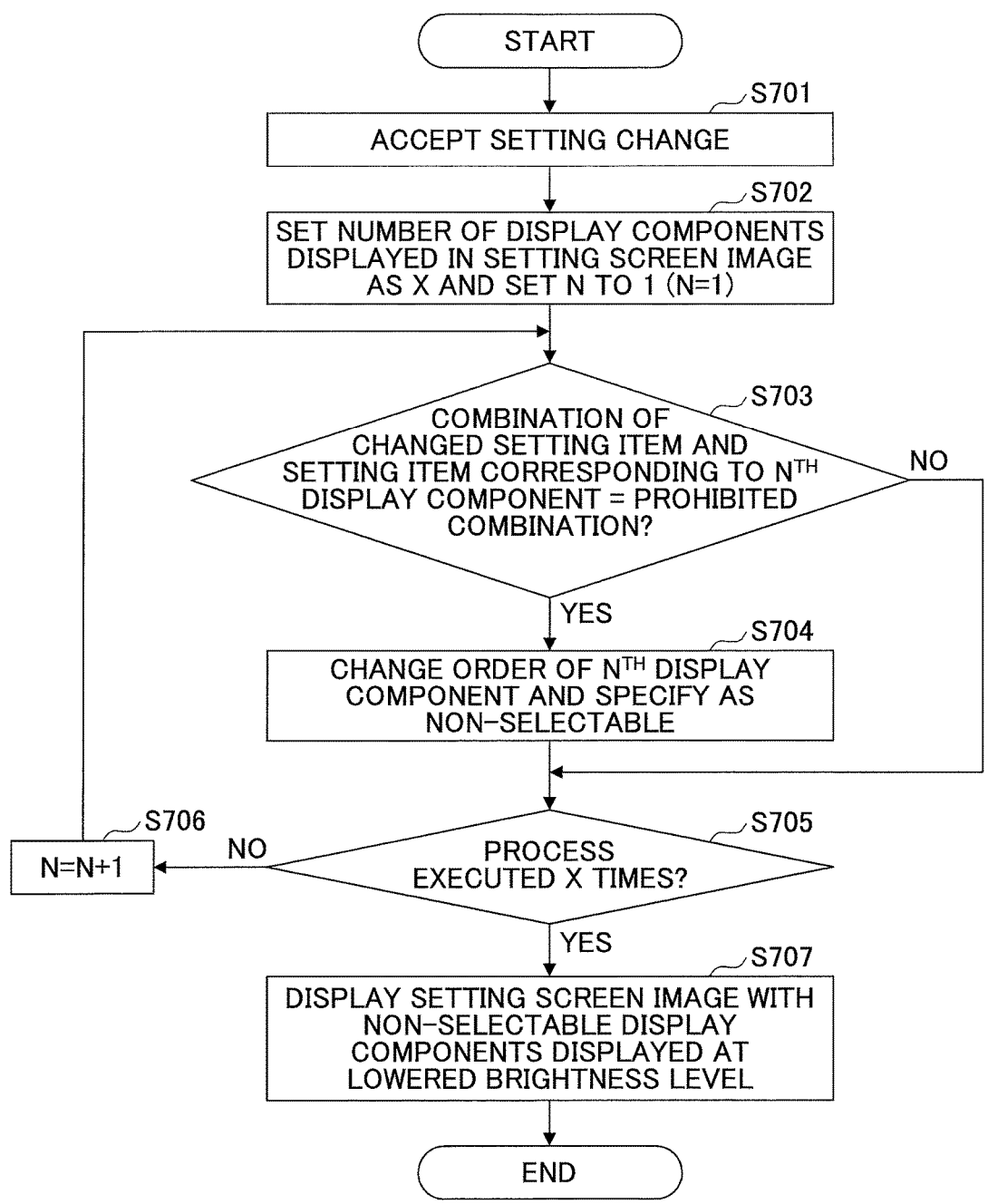
FIG. 7 is a flowchart illustrating an operation of a display control process unit according to the first embodiment.

In the following, an operation of the display control process unit 240 according to the present embodiment is described with reference to FIG. 7. FIG. 7 is a flowchart illustrating an example operation of the display control process unit 240 according to the first embodiment.

In step S701, the input accepting unit 241 of the display control process unit 240 of the operation apparatus 200 accepts a setting change operation for changing a setting of a setting item via a setting screen that is displayed on the operation panel 205.

Specifically, the input accepting unit 241 of the display control unit 240 detects a contact made with respect to the operation panel 205, and the contact position detecting unit 242 detects the contact position of the detected contact. Then, the display control process unit 240 determines the specific display component that is displayed in a region of the setting screen including the contact position detected by the contact position detecting unit 242, and determines that an operation has been made with respect to the specific display component.

If a setting change can be implemented with respect to the setting item corresponding to the specific display component by operating the specific display component on the setting screen, the display control process unit 240 of the present embodiment accepts the operation as a setting change operation with respect to the setting item corresponding to the specific display component.

Also, in a case where the setting change with respect to the setting item corresponding to the specific display component is to be implemented via a detailed setting screen as described below, the display control process unit 240 controls the operation panel 205 to transition its display from the setting screen to the detailed setting screen. Then, the display control process unit 240 accepts a setting change for the setting item by accepting an operation made with respect to the detailed setting screen.

Then, in step S702, the display control unit 243 of the display control process unit 240 sets X to represent the number of display components to be displayed in the setting screen image, and sets a variable N to 1 (N=1).

Note that the number of display components to be displayed in the setting screen image may be equal to the number of all the setting items included in the prohibited condition table 261, for example. Alternatively, the number of display components to be displayed in the setting screen image may correspond to the number of a part of the setting items included in the prohibited condition table 261. Also, the number of display components to be displayed in the setting screen image may correspond to the number of all the setting items subject to order management by the layout management table 262, for example. Note that the number of display components subject to order management by the layout management table 262 may be equal to the number of all the setting items included in the prohibited condition table 261, for example.

Then, in step S703, the combination determining unit 245 of the display control unit 243 refers to the prohibited condition table 261 to determine whether the changed setting item and the setting item corresponding to the $N^{th}$ display component in the setting screen image correspond to a prohibited combination. That is, the combination determining unit 245 determines whether a value is prohibited from being set up for the setting item corresponding to the $N^{th}$ display component in combination with the changed setting item.

If it is determined in step S703 that the above combination of the setting items does not correspond to a prohibited combination, the display control unit 243 proceeds to step S705, which is described below.

If it is determined in step S703 that the above combination of the setting items corresponds to a prohibited combination, the table updating unit 246 of the display control unit 243 changes the order of the $N^{th}$ display component listed in the layout management table 262, and changes the value for the information item "selectability" associated with the setting item corresponding to the $N^{th}$ display component to indicate that the $N^{th}$ display component cannot be selected (step S704). Specifically, the table updating unit 246 arranges the $N^{th}$ display component to be at the end of the display components listed in the layout management table 262. Note that upon changing the order of the $N^{th}$ display component, the table updating unit 246 also changes the order of the other display components by moving up the positions of the display components that were previously positioned after the $N^{th}$ display component. Note that the process of step S704 is described in detail below.

Then, in step S705, the display control unit 243 determines whether the process from step S703 onward has been executed X times. If it is determined in step S705 that the process has not been executed X times, the display control unit 243 increments the value of the variable N by 1 (N=N+1) and returns to step S703 (step S706).

If it is determined in step S705 that the process has been executed X times (i.e., the process has been executed with respect to all the display components to be displayed in the setting screen image), the display switching unit 247 of the display control unit 243 refers to the layout management table 262 and switches the display of the setting screen by rearranging the order in which the display components corresponding to setting items are displayed in the setting screen according to the order of the setting items indicated in the updated layout management table 262 (step S707). Note that at this time, the non-configurable display components that cannot be selected are displayed at a lower brightness level as compared with the brightness level at which the configurable display components are displayed. More specifically, the brightness level of the non-configurable display components is controlled to be about half (½) the brightness level at which the configurable display components are displayed.

In the following, the process implemented by the table updating unit 246 according to the present embodiment is described with reference to FIGS. 8A and 8B. FIG. 8A illustrates the layout management table 262 prior to being updated, and FIG. 8B illustrates a layout management table 262-1 that has been updated.

Note that FIGS. 8A and 8B illustrate an example case in which the display component corresponding to the setting item "staple" displayed on the setting screen has been operated and the value "upper left diagonal" has been set up for the setting item "staple".

In this case, the combination determining unit 245 of the display control unit 243 refers to the prohibited condition table 261 and determines whether each of the other setting items is prohibited from being set up in combination with the setting item "staple".

In the present example, the setting item that is prohibited from being set up in combination with the setting item "staple" includes the setting item "booklet". Further, when the value "upper left diagonal" is set up for the setting item "staple", a value for the setting item "hole punch" cannot be set up in combination with the value "upper left diagonal" for the setting item "staple".

Thus, the table updating unit 246 changes the values for the information item "order" associated with the setting item "hole punch" and the setting item "booklet" in the layout management table 262 such that the setting item "hole punch" and the setting item "booklet" come last in order after all the other setting items listed in the layout management table 262. Also, the table updating unit 246 changes the value of the information item "selectability" associated with the setting item "hole punch" and the setting item "booklet" from the value "○" to the value "x" indicating that these setting items are non-selectable.

Note that in the layout management table 262 and the layout management table 262-1 illustrated in FIGS. 8A and 8B, twelve display components are listed as display components to be displayed in the setting screen image.

In the layout management table 262, the value indicating the "order" of the setting item "booklet" is set to "8", and the value indicating the "selectability" of the setting item "booklet" is set to "○". Also, in the layout management table 262, the value indicating the "order" of the setting item "hole punch" is set to "5", and the value indicating the "selectability" of the setting item "hole punch" is set to "○".

The table updating unit 246 according to the present embodiment updates the layout management table 262 to obtain the layout management table 262-1 of FIG. 8B based on the result of the determination made by the combination determining unit 245.

In the layout management table 262-1, the value indicating the "order" of the setting item "booklet" is set to "12" corresponding to the end of the list of display components, and the value indicating the "selectability" of the setting item "booklet" is set to "x" indicating that the setting item is non-selectable. Also, in the layout management table 262-1, the value indicating the "order" of the setting item "hole punch" is set to "11", and the value indicating the "selectability" of the setting item "hole punch" is set to "x".

Note that in the layout management table 262, the setting item "hole punch" comes before the setting item "booklet" (i.e., the value indicating the "order" of the setting item "hole punch" is smaller than the value indicating the order of the setting item "booklet"), and as such, the setting item "hole punch" is also arranged to come before the setting item "booklet" in the updated layout management table 262-1.

Further in the layout management table 262-1, the setting items "sort" and "divide" that were originally positioned after the setting item "hole punch" are each moved up by one place. Also, in the layout management table 262-1, the setting items "double spread", "print", "combine", and "external paper supply" that were originally positioned after the setting item "booklet" are each moved up by two places.

Also, note that in the above example, the value "○" is set up as the value of the information item "selectability" to indicate that a corresponding setting value is selectable, and the value "x" is set up as the value of the information item "selectability" to indicate that a corresponding setting value is non-selectable. However, the values of the information item "selectability" for indicating whether a setting item is selectable or non-selectable are not limited to the above values "○" and "x".

In the following, example screen transitions of the operation apparatus 200 according to the present embodiment are described with reference to FIGS. 9-12.

Figure 9:
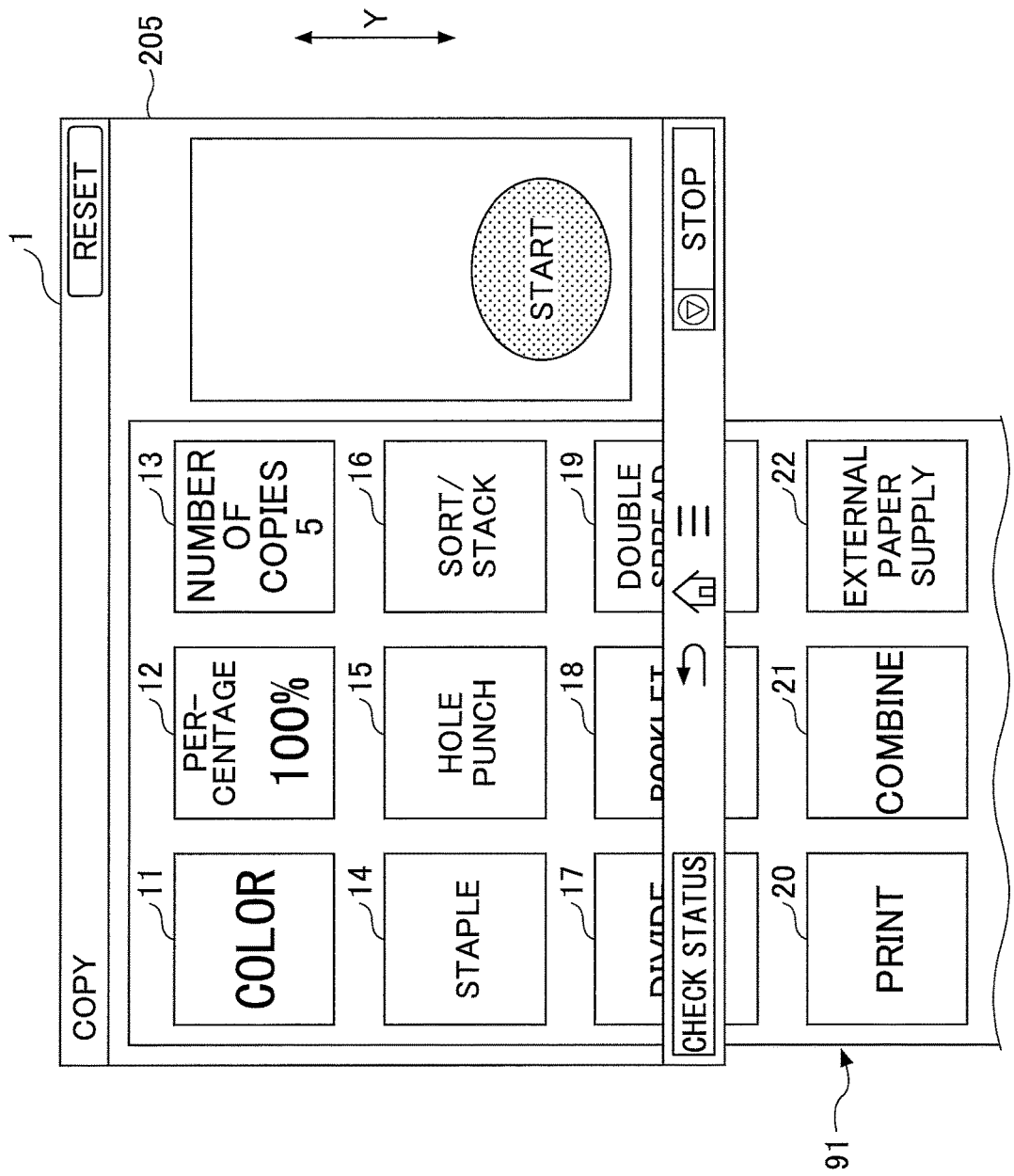
FIG. 9 is a diagram illustrating an example of a setting screen according to the first embodiment.

FIG. 9 illustrates an example display of the setting screen according to the first embodiment. In the example of FIG. 9, the operation panel 205 is controlled to display a setting screen 1 by displaying a setting screen image 91.

The setting screen image 91 includes display components 11-22 corresponding to setting items that are subject to order management by the layout management table 262. In the setting screen image 91 of the present embodiment, the display components are arranged in multiple rows, with each row including three display components. In the setting screen image 91 of present embodiment, the display components 11-22 are arranged in ascending order from the upper left side toward the lower right side based on their corresponding order specified in the layout management table 262.

More specifically, the display component 11 corresponding to the setting item "color" with the value "1" set up as its "order" is arranged at the far left end on the uppermost row of the setting screen image 91, and the display component 12 corresponding to the setting item "percentage" with the value "2" set up as its "order" is arranged second from left on the uppermost row of the setting screen image 91. Further, the display component 13 corresponding to the setting item "number of copies" with the value "3" set up as its "order" is arranged at the third from left (far right end) on the uppermost row of the setting image 91, and the display component 14 corresponding to the setting item "staple" with the value "4" set up as its "order" is arranged at the far left end of the next row from the uppermost row of the setting screen image 91.

Note that by scrolling the setting screen image 91 in the directions of arrow Y, the display of the setting screen 1 may be controlled to display the display components that are arranged at a corresponding display area to be displayed by the operation panel 205.

Figure 10:
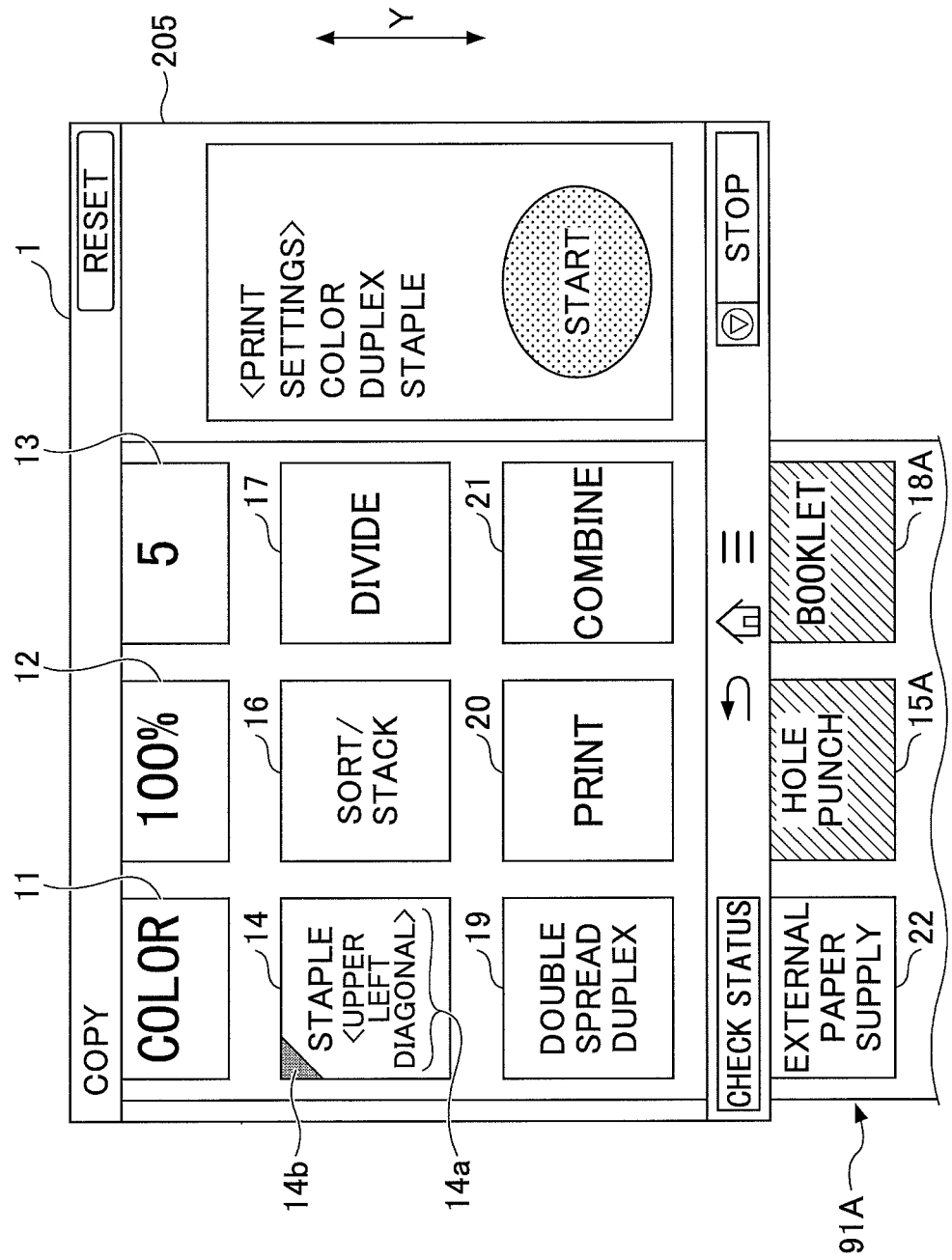
FIG. 10 is a diagram illustrating another example of the setting screen according to the first embodiment.

FIG. 10 illustrates another example display of the setting screen according to the first embodiment. In the example of FIG. 10, the setting screen 1 is controlled to display a setting screen image 91A based on the layout management table 262-1.

In the present example, a message 14a and a marker 14b are displayed in the display component 14 corresponding to the setting item "staple". The message 14a indicates that the value "upper left diagonal" has been set up for the setting item "staple".

Also, in the layout management table 262-1, the "order" of the display component 15 corresponding to the setting item "hole punch" is set to "11" (second from last), and the "order" of the display component 18 corresponding to the setting item "booklet" is set to "12" as the last setting item. Thus, in the setting screen image 91A, the display components 15 and 18 are respectively arranged $11^{th}$ and $12^{th}$, counting from the display component 11, which is arranged first at the upper left corner of the image 91A.

Also, in the setting screen image 91A, the display components 15 and 18 are respectively displayed as non-configurable display components 15A and 18A that cannot be selected. The non-configurable display components 15A and 18A are displayed at a lower brightness level as compared with the brightness level at which the other selectable display components (configurable display components) are displayed.

According to an aspect of the present embodiment, by displaying the setting screen image 91A for displaying the setting screen 1 as described above, when the value "upper left diagonal" is set up for the setting item "staple" via the setting screen 1 illustrated in FIG. 9, the display of the setting screen 1 may be rearranged as illustrated in FIG. 10 such that non-configurable display components are not arranged within a display area to be displayed by the operation panel 205. According to a further aspect of the present embodiment, non-configurable display components may be prevented from being intermixed with configurable display components, and in this way, operability of the setting screen may be improved, for example.

Further, according to an aspect of the present embodiment, the "order" of the setting items in the layout management table 262 is configured such that the higher the frequency of setting changes made with respect to a setting item, the smaller the value of the "order" of the setting item. That is, a display component that accepts a setting change operation at a higher frequency is placed higher (earlier) in the setting screen image 91.

Accordingly, in the present embodiment, the position of a non-configurable display component that cannot be selected can be suitably changed to be positioned far away from a configurable display component that frequently accepts a setting change operation.

In this way, a configurable display component that is frequently operated and a non-configurable display component may be prevented from being displayed at the same time within a display area displayed by the operation panel 205, and the operability of the setting screen may be improved.

Figure 11:
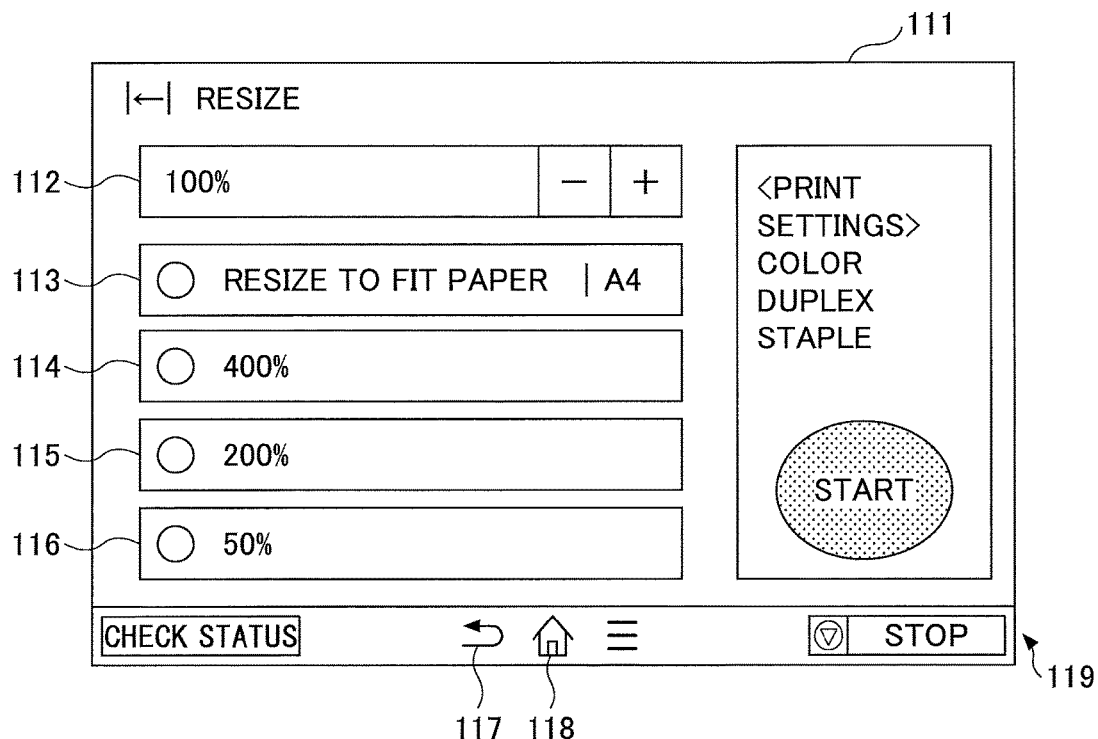
FIG. 11 is a diagram illustrating an example of a detailed setting screen.

In the following, an example detailed setting screen according to the present embodiment is described with reference to FIG. 11. FIG. 11 illustrates an example of a detailed setting screen 111 according to the present embodiment.

The detailed setting screen 111 of FIG. 11 is for setting up a value for a setting related to resizing a printed image. The detailed setting screen 111 may be displayed on the operation panel 205 when the display component 12 corresponding to the setting item "percentage" displayed in the setting screen 1 is operated.

The detailed setting screen 111 includes display components 112-116 for setting up resizing settings for printing (e.g., by selecting a percentage or a paper size). A desired resizing setting may be set up by operating the corresponding display component at the detailed setting screen 111.

Also, the detailed setting screen 111 includes a display component 117 for switching the display to the setting screen 1, and a display component 118 for switching the display to a home screen, which is described in detail below.

The display component 117 and the display component 118 may be displayed in a predetermined display area 119 of the operation panel 205. The display area 119 may also be displayed in the setting screen 1. In this case, the display area 119 includes the display components 117 and 118.

Figure 12:
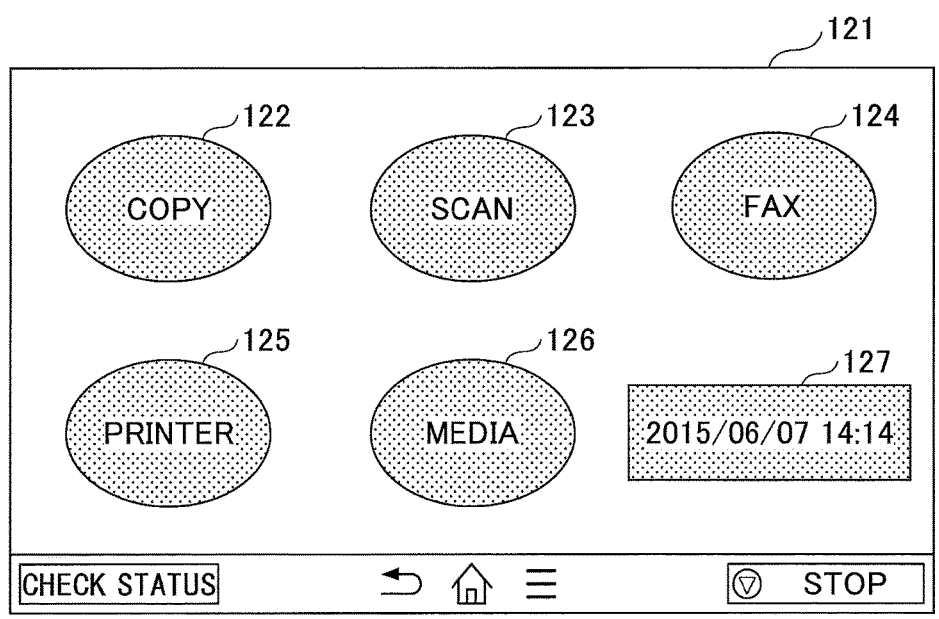
FIG. 12 is a diagram illustrating an example of a home screen.

In the following, the home screen according to the present embodiment is described with reference to FIG. 12. FIG. 12 illustrates an example of a home screen 121.

The home screen 121 according to the present embodiment includes display components (icons) 122-126 corresponding to functions of the image processing apparatus 100.

For example, the display component 122 corresponds to a copy function, the display component 123 corresponds to a scan function, and the display component 124 corresponds to a fax function. The display component 125 corresponds to a printer function, and the display component 126 corresponds to a media function of the image processing apparatus 100. Note that the media function refers to functions of the image processing apparatus 100 for reading information stored in a portable storage medium and performing various processes on the information.

For example, when the display component 122 displayed on the home screen 121 is operated (selected), the operation apparatus 200 of the present embodiment controls the display of the operation panel 205 to transition from the home screen 121 to the setting screen 1.

Also, in the operation apparatus 200 according to the present embodiment, when the display component 122 displayed on the home screen 121 is operated (selected), the main apparatus cooperation unit 250 sends a copy process execution request to the main apparatus 300 in response to the operation. The main apparatus 300 receives the copy process execution request and starts a copy application for executing the copy process.

Further, the home screen 121 according to the present embodiment may display a widget 127 in addition to the display components 122-126, for example.

Note that the display components displayed on the home screen 121 do not have to be elliptical as illustrated in FIG. 12 and may be arranged into some other shape, such as a rectangle or a circle, for example. Also, the shape of the display components displayed on the setting screen 1 of the present embodiment do not have to be rectangular as illustrated in FIGS. 1A, 1B, 9, and 10, and may be in some other shape, such as an ellipse or a circle, for example.

Also, although three display components are arranged per row in the setting screen 1 described above, the arrangement of the display components in the setting screen is not limited thereto and may be arranged in any other suitable manner as long as the display components are arranged in order according to the order assigned to the corresponding setting items in the layout management table 262. More specifically, for example, the display components may be arranged vertically or horizontally in one line within the setting screen image.

Further, in the above-described example, the non-configurable display components are arranged to be displayed at a lower brightness level as compared with the brightness level at which the configurable display components are displayed. However, embodiments of the present invention are not limited thereto. In other examples, the non-configurable display components may be displayed in a smaller size than the size of the configurable display components, or the non-configurable display components may be displayed in a different color from the color of the configurable display components. That is, the non-configurable display components may be displayed in any display mode that would enable a visual discrimination of the non-configurable display components from the configurable display components.

Second Embodiment

In the following, a second embodiment of the present invention is described. The second embodiment of the present invention differs from the above-described first embodiment in that a determination is made as to whether to a display component is to be displayed in the setting screen image. Note that in the following description of the second embodiment, features that are substantially identical to those of the first embodiment are given the same reference numerals and overlapping descriptions may be omitted.

Figure 13:
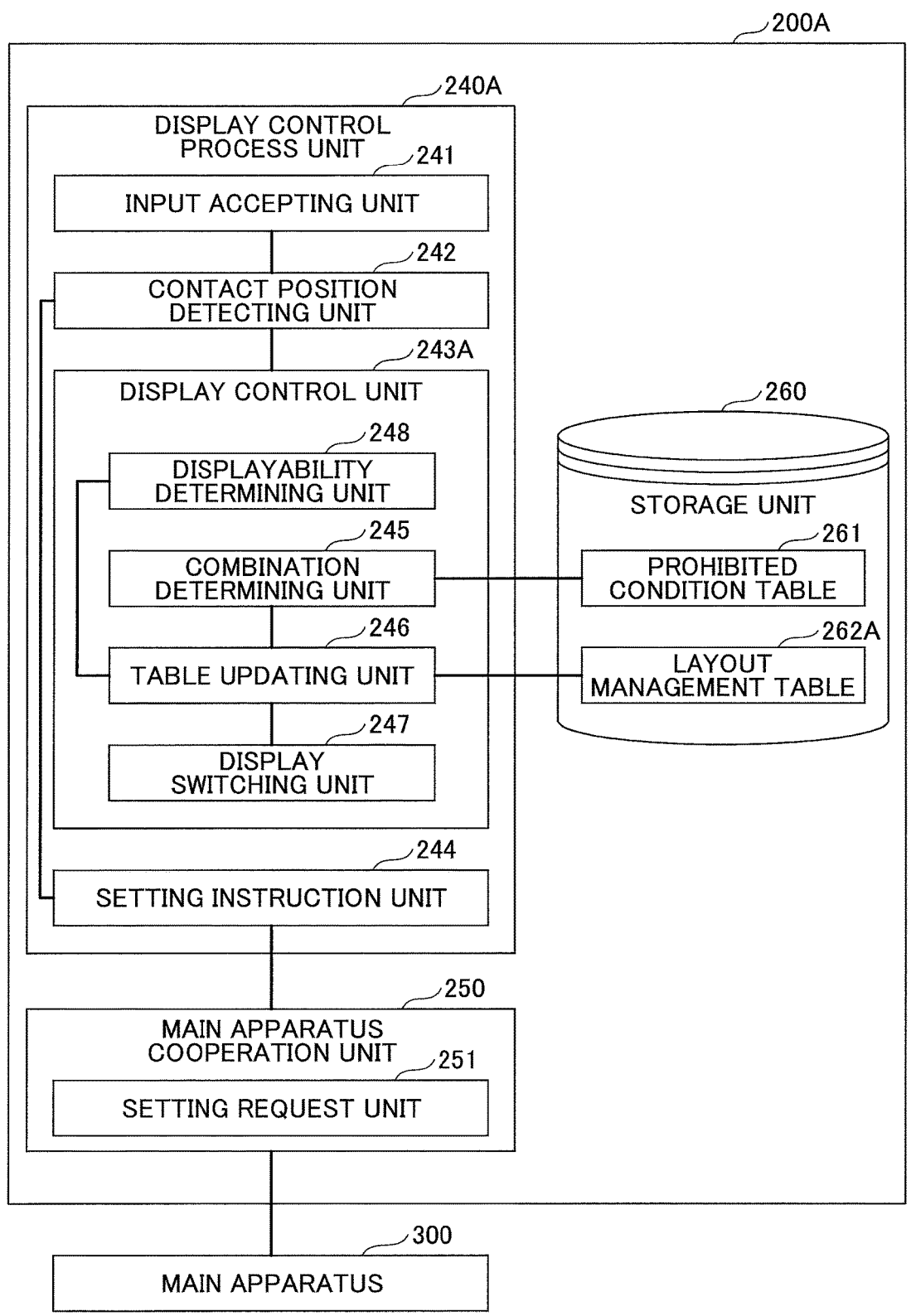
FIG. 13 is a block diagram illustrating an example functional configuration of the operation apparatus according to a second embodiment of the present invention.

FIG. 13 is a block diagram illustrating an example functional configuration of an operation apparatus 200A according to the second embodiment. The operation apparatus 200A according to the present embodiment includes a display control process unit 240A. The display control process unit 240A includes a display control unit 243A. Also, the storage unit 260 of the present embodiment includes a layout management table 262A.

The display control unit 243A according to the present embodiment includes a displayability determining unit 248 in addition the functional units included in the display control unit 243 according to the first embodiment.

The displayability determining unit 248 according to the present embodiment determines whether a value can be set up for a setting item corresponding to a display component to be arranged in a setting screen image based on a state of the main apparatus 300 and determines whether the display component can be displayed based on the result of the above determination.

The table updating unit 246 of the present embodiment updates the layout management table 262A based on the result of the determination made by the displayability determining unit 248.

Figure 14:
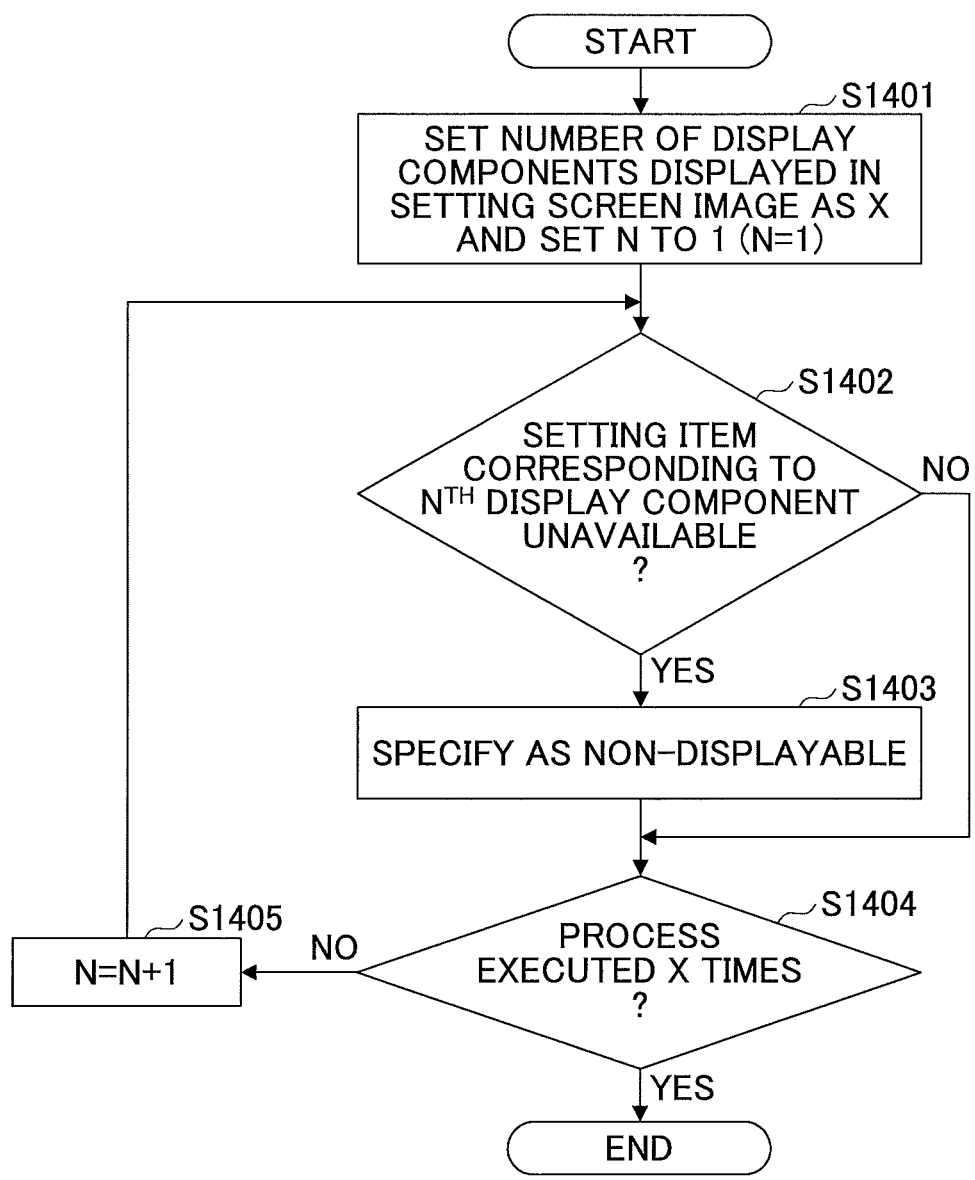
FIG. 14 is a flowchart illustrating a process implemented by a displayability determining unit according to the second embodiment.

In the following, a process implemented by the displayability determining unit 248 according to the present embodiment is described with reference to FIG. 14. FIG. 14 is a flowchart illustrating an example process implemented by the displayability determining unit 248 according to the second embodiment.

In step S1401, the display control unit 243A of the operation apparatus 200A according to the present embodiment sets the number of display components to be displayed in the setting screen image as X, and sets the variable N to 1 (N=1).

Then, in step S1402, the displayability determining unit 248 of the display control unit 243A determines whether the setting item corresponding to the N$^{th}$ display component corresponds to an unavailable setting item relating to a function that is not provided by the image processing apparatus 100. More specifically, the displayability determining unit 248 determines whether the setting item corresponding to the N$^{th}$ display component relates to a function using hardware that is not included in the main apparatus 300.

If it is determined in step S1402 that the setting item corresponding to the N$^{th}$ display component is available (NO in step S1402), the display control unit 243A proceeds to step S1404, which is described below.

If it is determined in step S1402 that the setting item corresponding to the N$^{th}$ display component is an unavailable setting item (YES in step S1402), the display control unit 243A specifies the display component as a non-displayable display component. More specifically, the table updating unit 246 of the display control unit 243A sets the value "x" for the information item "displayability" (described below) associated with the setting item corresponding to the N$^{th}$ display component in the layout management table 262A according to the present embodiment.

Then, in step S1404, the display control unit 243A determines whether the process from step S1402 onward has been executed X times. If it is determined in step S1404 that the process has not been executed X times, the display control unit 243A increments the value of the variable N by one (N=N+1), and returns to step S1402 (step S1405).

If it is determined in step S1404 that the process has been executed X times, the display control unit 243A ends the displayability determining process.

According to an aspect of the present embodiment, the process of FIG. 14 may be executed every time a change in the state of the main apparatus 300 is detected, for example. A change in the state of the main apparatus 300 may include additional connection of new hardware to the main apparatus 300 and/or removal of hardware connected to the main apparatus 300, for example. Specific examples of hardware that can be connected to or removed from the main apparatus 300 include an ADF (Auto Document Feeder), a paper deck (external paper supply unit), and a finisher.

For example, if a finisher is not connected to the main apparatus 300, processes for implementing the functions of the finisher, such as stapling, hole punching, or bookbinding cannot be performed. Thus, in this case, even when values are set up for the setting items relating to the functions of the finisher, the processes for implementing these functions cannot be performed by the image processing apparatus 100.

In this respect, according to an aspect of the present embodiment, the display control unit 243A may determine whether a finisher is connected to the main apparatus 300, and based on the result of the above determination, the display control unit 243A may determine whether to display the display components corresponding to the setting items related the functions of the finisher, such as stapling, hole punching, and bookbinding, for example.

Also, for example, when a paper deck (external paper supply unit) is not connected to the main apparatus 300, an external paper supply function for supplying paper to the main apparatus 300 from an external source other than a paper feed tray of the main unit 300 cannot be implemented. Thus, in this case, even when a value is set up for a setting item related to the external paper supply function, such a function cannot be implemented by the image processing apparatus 100. In this respect, according to an aspect of the present embodiment, the display control unit 243A may determine whether a paper deck is connected to the main apparatus 300, and based on the result of the above determination, the display control unit 243A may determine whether to display the display component corresponding to the setting item relating to the external paper supply function.

As described above, in the present embodiment, a display component corresponding to an unavailable setting item relating to a function other than the functions provided by the image processing apparatus 100 may be specified as a non-displayable display component so that the display component will not be displayed in the setting screen image.

FIG. 15 illustrates an example of the layout management table 262A according to the second embodiment. The layout management table 262A according to the present embodiment includes the information item "displayability" and a corresponding value indicating the result of the displayability determining process implemented by the displayability determining unit 248 with respect to each setting item.

The layout management table 262A of the present embodiment includes the information items "order", "setting item", "selectability", and "displayability".

The value for the information item "displayability" associated with a setting item represents the result of the displayability determining process implemented by the displayability determining unit 248 with respect to the setting item and indicates whether the display component corresponding to the setting item is to be displayed (i.e., whether the display component is displayable or non-displayable). In the layout management table 262A of FIG. 14, the value for the information item "displayability" associated with the setting item "external paper supply" is set to "x", indicating that the display component corresponding to the setting item "external paper supply" is non-displayable.

Note that in the present example, the value "○" is set up for the information item "displayability" to indicate that a corresponding display component is displayable, and the value "x" is set up for the information item "displayability" to indicate that a corresponding display component is non-displayable. However, embodiments of the present invention are not limited thereto as long as values are set up for the information item "displayability" to indicate whether a corresponding display component is displayable or non-displayable.

In the following, an operation of the display control process unit 240A according to the present embodiment is described with reference to FIG. 16. FIG. 16 is a flowchart illustrating an example operation of the display control process unit 240A according to the second embodiment.

Note that processes of steps S1601 and S1602 of FIG. 16 are substantially identical to the processes of steps S701 and S702 of FIG. 7, and as such, descriptions thereof will be omitted.

In step S1603, the display control unit 243A of the display control process unit 240A controls the table updating unit 246 to refer to the layout management table 262A to determine whether the $N^{th}$ display component can be displayed.

If it is determined in step S1603 that the display component is non-displayable (NO in step S1603), the table updating unit 246 changes the order of the setting item corresponding to the $N^{th}$ display component to be at the end of the setting items listed in the layout management table 262A (step S1604). Then, the process proceeds to step S1609, which is described below.

If it is determined in step S1603 that the display component is displayable (YES in step S1603), the combination determining unit 245 of the display control unit 243A refers to the prohibited condition table 261 to determine whether a combination of the changed setting item and the setting item corresponding to the $N^{th}$ display component corresponds to a prohibited combination (step S1605).

If it is determined in step S1605 that the above combination is not a prohibited combination (NO in step S1605), the display control unit 243A proceeds to step S1609, which is described below.

If it is determined in step S1605 that the above combination is a prohibited combination (YES in step S1605), the table updating unit 246 refers to the layout management table 262A and determines whether one or more setting items corresponding to non-displayable display components are included in the layout management table 262A (step S1606). If it is determined in step S1606 that non-displayable display components are included (YES in step S1606), the table updating unit 246 changes the order of the $N^{th}$ display component to come last among the display components to be displayed but before the non-displayable display components (step S1607). Then, the process proceeds to step S1609, which is described below.

If it is determined in step S1605 that the above combination is not a prohibited combination (NO in step S1605), the table updating unit 246 proceeds to step S1608.

Note that the processes from step S1608 to step S1611 of FIG. 16 are substantially identical to the processes from step S704 to step S707 of FIG. 7, and as such, descriptions thereof are omitted.

FIGS. 17A and 17B illustrate an example case of updating of the layout management table 262A according to the second embodiment. FIG. 17A illustrates the layout management table 262A prior to being updated, and FIG. 17B illustrates a layout management table 262A-1 that has been updated.

Note that FIGS. 17A and 17B illustrate an example case where the display component corresponding to the setting item "staple" displayed on the setting screen has been operated and the value "upper left diagonal" has been set up for the setting item "staple".

In the case where the value "upper left diagonal" is set up for the setting item "staple", it is determined that a value for the setting item "hole punch" and a value for the setting item "booklet" are prohibited from being set up in combination with the value "upper left diagonal" for the setting item "staple". Also, in the layout management table 262A, the display component corresponding to the setting item "external paper supply" is specified as non-displayable.

Thus, in the present example, the table updating unit 246 changes the value indicating the "order" of the setting item "hole punch" in the layout management table 262A-1 to "11", which is before the setting item "external paper supply" but last among the displayable display components. Then, the table updating unit 246 changes the value indicating the "order" of the setting item "booklet" in the layout management table 262A-1 to "11", which is before the setting item "external paper supply" but last among the displayable display components. Note that by changing the "order" of the setting item "booklet" to "11", the "order" of the setting item "hole punch" is moved up by one place to "10".

Figure 18:
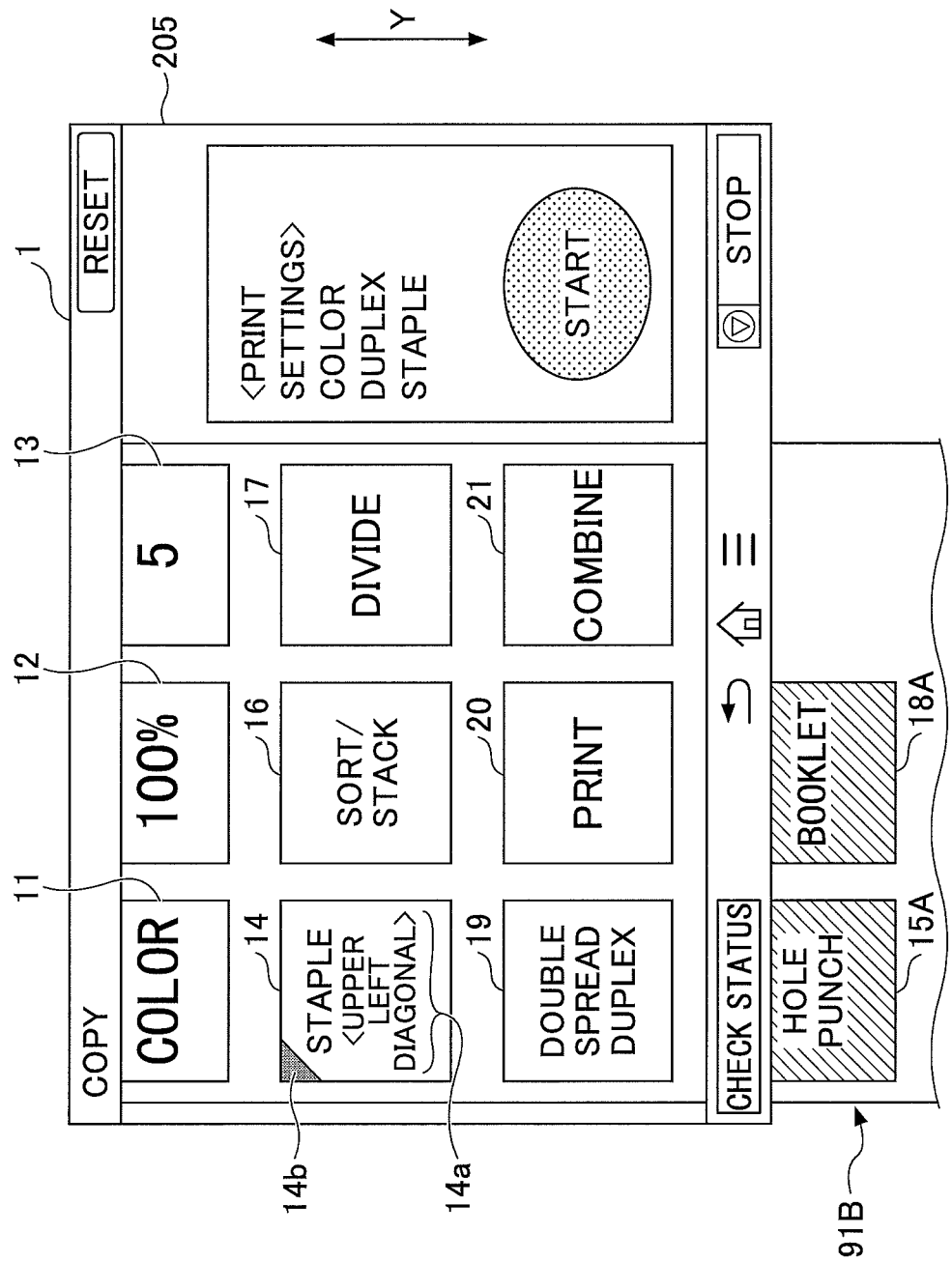
FIG. 18 is a diagram illustrating an example of the setting screen according to the second embodiment.

In the following, the setting screen that is displayed based on the layout management table 262A-1 according to the present embodiment is described. FIG. 18 illustrates the setting screen 1 according to the second embodiment.

The setting screen 1 of FIG. 18 illustrates an example case where a setting screen image 91B based on the layout management table 262A-1 is displayed on the operation panel 205.

In the present example, the display component corresponding to the setting item "external paper supply" with the value "12" set up as its "order" in the layout management table 262A-1 corresponds to a non-displayable display component. Thus, the display component 22 corresponding to the setting item "external paper supply" is not included in the setting screen image 91B.

Also, in the setting screen image 91B, the display component 18A corresponding to the setting item "booklet" is arranged at the end of the display components that are displayed in the setting screen image 91B, and the display component 15A corresponding to the setting item "hole punch" is arranged second to last, right in front of the display component 18A.

As described above, according to an aspect of the present embodiment, a display component corresponding to a setting item relating to a function that cannot be implemented by the image processing apparatus 100 can be excluded from the setting screen image.

Third Embodiment

In the following, a third embodiment of the present invention is described. The third embodiment differs from the above-described first embodiment in that under certain conditions, the order in which display components are arranged is not changed even when it is determined that a setting item is a prohibited from being set up in combination with a selected setting item for which a value has been set up. In the following description of the third embodiment, features that are substantially identical to those of the first embodiment and the second embodiment are given the same reference numerals and overlapping descriptions may be omitted.

Figure 19:
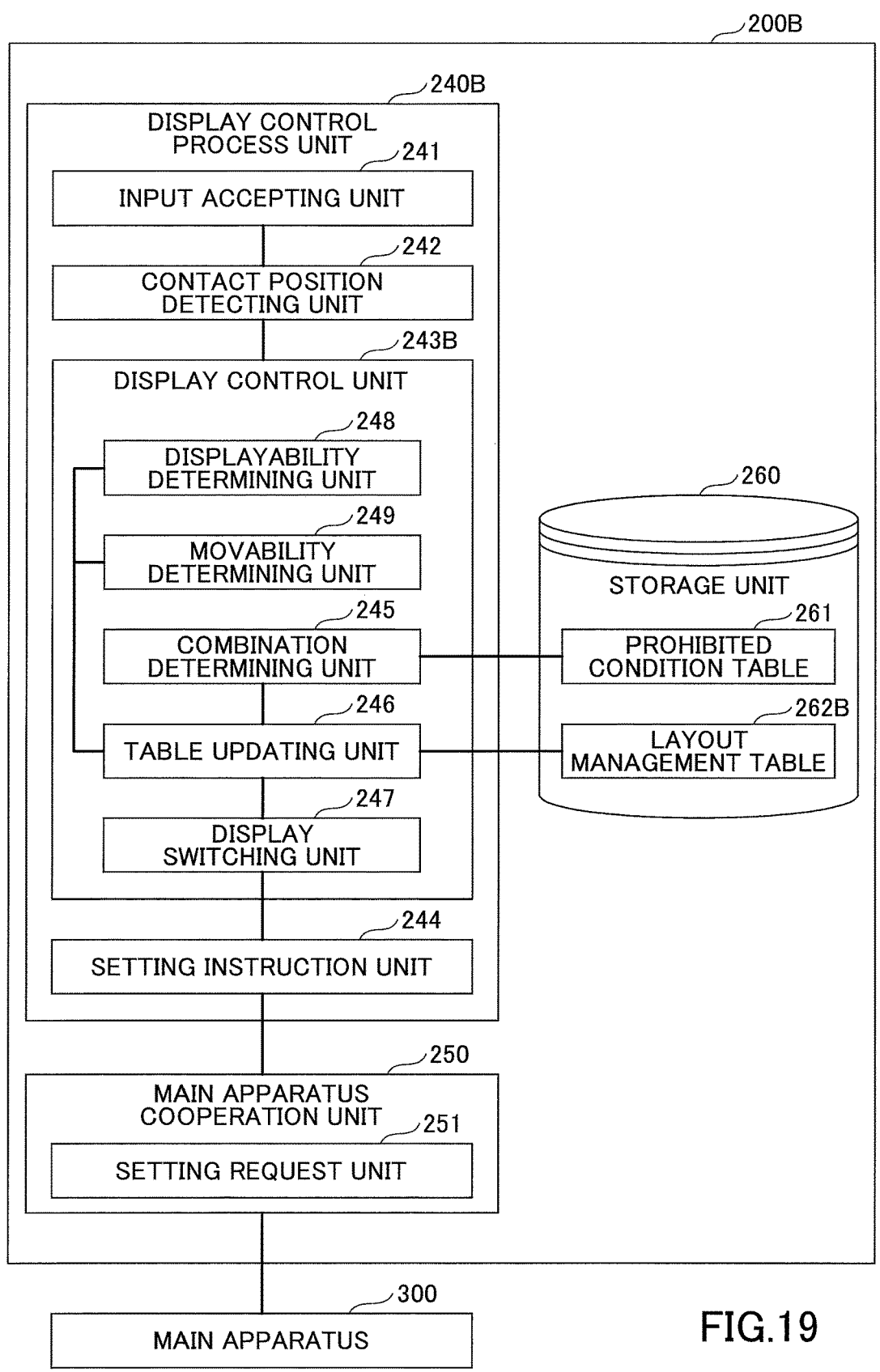
FIG. 19 is a block diagram illustrating an example functional configuration of the operation apparatus according to a third embodiment of the present invention.

FIG. 19 is a block diagram illustrating an example functional configuration of an operation apparatus 200B according to the third embodiment. The operation apparatus 200B according to the third embodiment includes a display control unit 240B. The display control process unit 240B includes a display control unit 243B. The storage unit 260 of the present embodiment includes a layout management table 262B.

The display control unit 243B of the present embodiment includes a movability determining unit 249 in addition to the functional units included in the display control unit 243A according to the second embodiment.

The movability determining unit 249 of the present embodiment determines whether to change the arrangement order of a display component corresponding to a setting item based on the usage frequency of the setting item, for example. In other words, the movability determining unit 249 determines whether to move a display component corresponding to a setting item to another position within the setting screen image depending on how frequently the setting item is used (e.g., how frequently the display component is operated), for example.

The table updating unit 246 of the present embodiment updates the layout management table 262B based on the result of the determination made by the movability determining unit 249.

Figure 20:
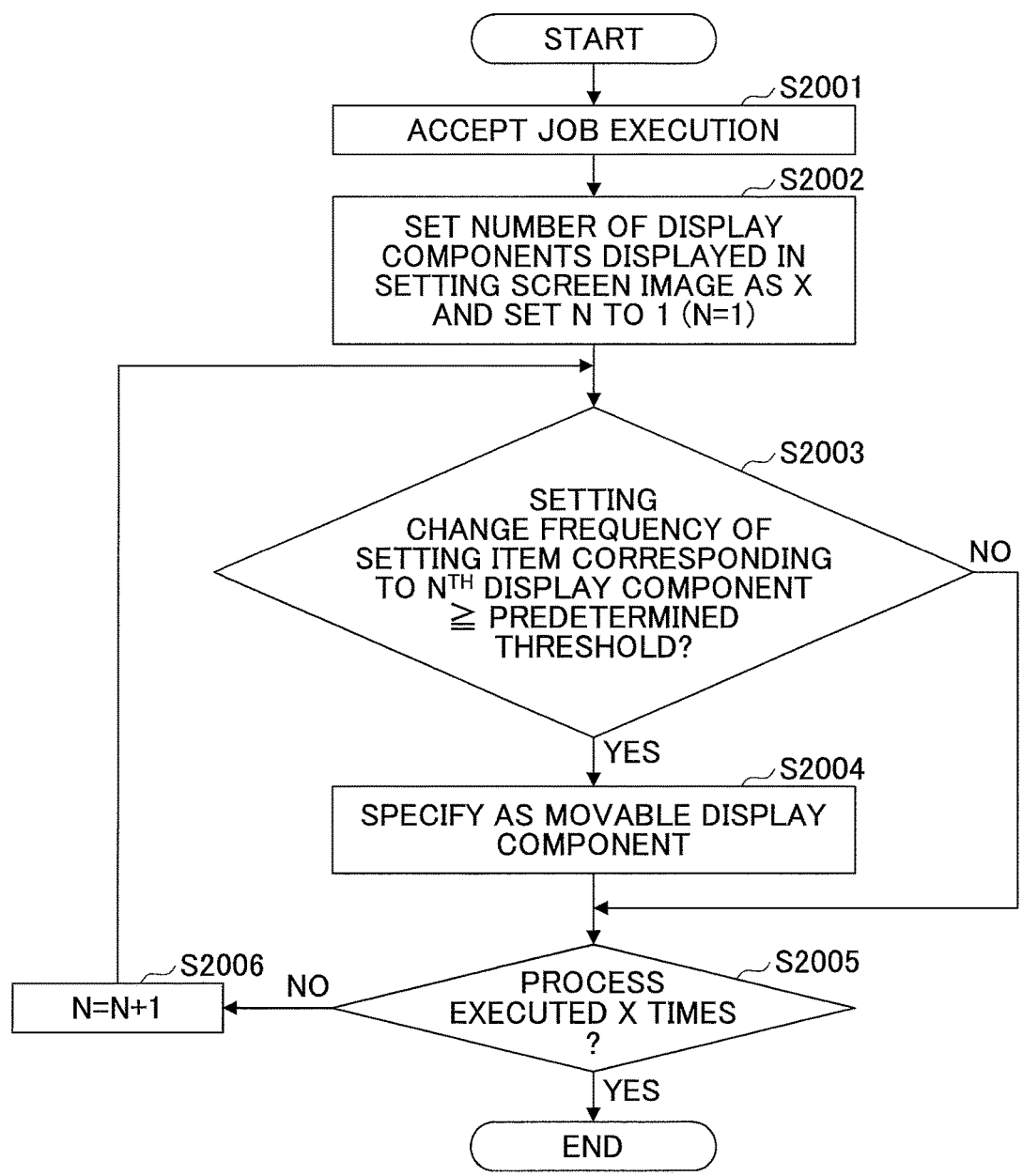
FIG. 20 is a flowchart illustrating a process implemented by a movability determining unit according to the third embodiment.

In the following, a process implemented by the movability determining unit 249 according to the present embodiment is described with reference to FIG. 20. FIG. 20 is a flowchart illustrating an example process implemented by the movability determining unit 249 according to the third embodiment.

When the operation apparatus 200B according to the present embodiment accepts a job execution (step S2001), the display control unit 243B sets the number of display components to be displayed in the setting screen image as X, and sets the variable N to 1 (N=1) (step S2002).

Then, in step S2003, the movability determining unit 249 of the display control unit 243B determines whether the frequency of setting changes made with respect to the setting item corresponding to the $N^{th}$ display component is greater than or equal to a predetermined threshold. In the present embodiment, it is assumed that the operation apparatus 200B counts the setting change frequency of each setting item and stores the frequency count in the storage unit 260. Also, it is assumed that the predetermined threshold referred to in step S2003 is stored in the storage unit 260 in advance.

Note that the predetermined threshold may be arbitrarily changed as desired, for example.

If it is determined in step S2003 that the setting change frequency of the setting item corresponding to the $N^{th}$ display component is less than the predetermined threshold (NO in step S2003), the display control unit 243B proceeds to step S2005, which is described below.

If it is determined in step S2003 that the setting change frequency of the setting item corresponding to the $N^{th}$ display component is greater than or equal to the predetermined threshold (YES in step S2003), the table updating unit 246 of the display control unit 243B sets up the layout management table 262B to disable a change in the arrangement order of the $N^{th}$ display component (step S2004). Specifically, the table updating unit 246 of the display control unit 243B sets up the value "x" for the information item "movability" (described below) that is associated with the setting item corresponding to the $N^{th}$ display component in the layout management table 262B.

Then, in step S2005, the display control unit 243B determines whether the process from step S2003 onward has been executed X times. If it is determined in step S2005 that the process has not been executed X times (NO in step S2005), the display control unit 243B increments the value of the variable N by one (N=N+1), and returns to step S2003 (step S2006).

If it is determined in step S2005 that the process has been executed X times (YES in step S2005), the display control unit 243B ends the movability determining process.

In the following, the layout management table 262B according to the present embodiment is described with reference to FIG. 21. FIG. 21 illustrates an example of the layout management table 262B according to the third embodiment.

The layout management table 262B of the present embodiment includes a value indicating the result of the determination made by the movability determining unit 249.

The layout management table 262B of the present embodiment includes the information items "order", "setting item", "selectability", "displayability", and "movability".

The value for the information item "movability" associated with a setting item represents the result of the determination made by the movability determining unit 249 with respect to the setting item and indicates whether a change may be made to the arrangement order of the display component corresponding to the setting item. If a change cannot be made to the arrangement order of the display component, the display component cannot be rearranged within the setting screen image (i.e. the display component cannot be moved).

In the layout management table 262B of FIG. 21, the value "x" is set up for the information item "movability" associated with the setting items "color", "percentage", "number of copies", and "hole punch", indicating that the arrangement order of display components corresponding to the above setting items cannot be changed.

Note that in the present example, the value "○" is set up for the information item "movability" to indicate that the arrangement order of a corresponding display component can be changed, and the value "x" is set up for the information item "movability" to indicate that the arrangement order of a corresponding display component cannot be changed. However, embodiments of the present invention are not limited thereto. That is, other values may be set up for the information item "movability" as long as they indicate whether a change in the arrangement order of a corresponding display component is allowed or prohibited (i.e. whether the display component is movable).

Figure 22:
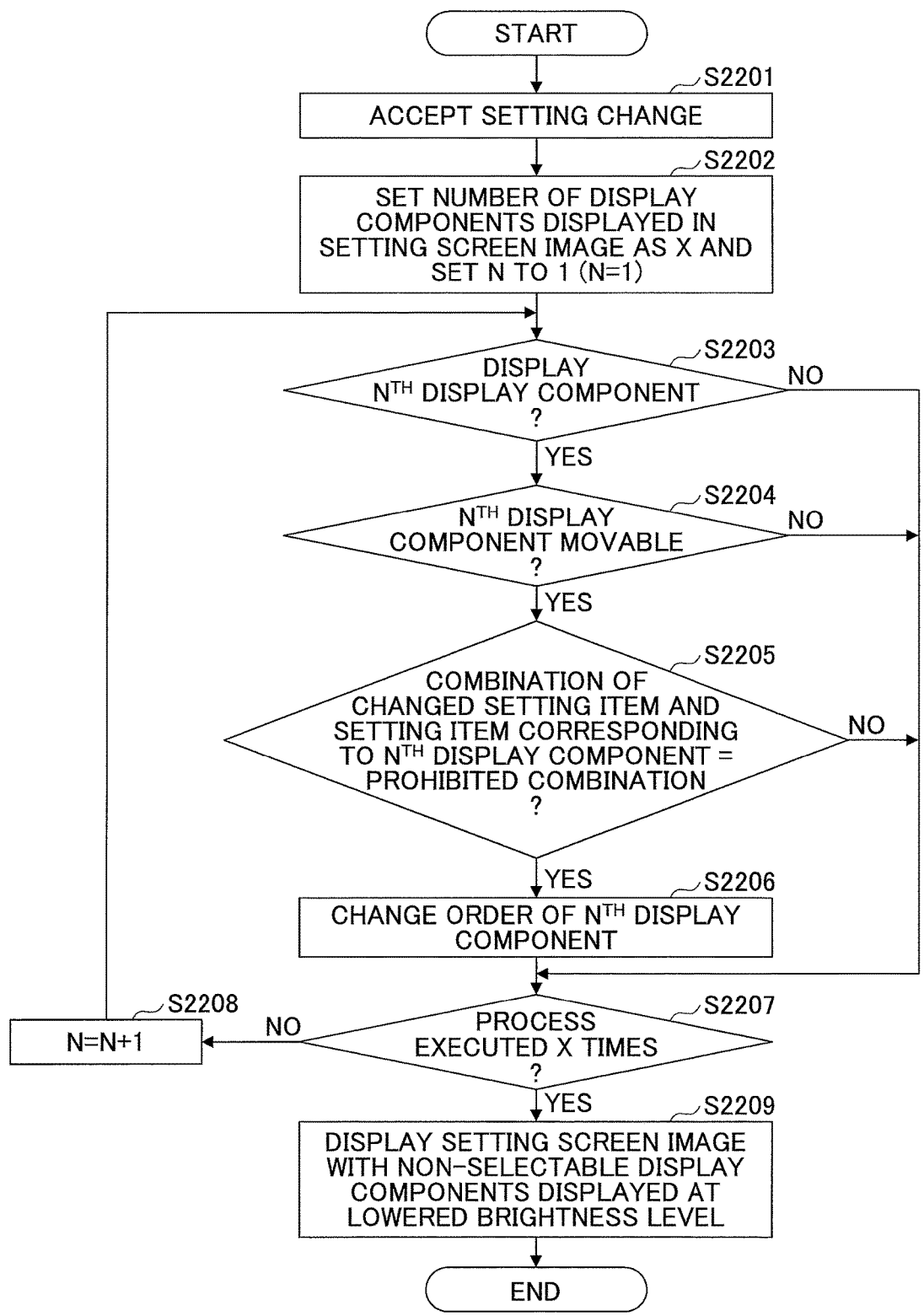
FIG. 22 is a flowchart illustrating an operation of the display control process unit according to the third embodiment.

In the following, an operation of the display control process unit 240B according to the present embodiment is described with reference to FIG. 22. FIG. 22 is a flowchart illustrating an example operation of the display control process unit 240B according to the third embodiment.

Note that the processes from step S2201 to step S2203 of FIG. 22 are substantially identical to the processes from step S1601 to step S1603 of FIG. 16, and as such, descriptions thereof will be omitted.

If it is determined in step S2203 that the $N^{th}$ display component can be displayed (YES in step S2203), the table updating unit 246 refers to the layout management table 262B to determine whether the $N^{th}$ display component is movable (step S2204). In other words, the table updating unit 246 determines whether the arrangement order of the $N^{th}$ display component can be changed.

If it is determined in step S2204 that the $N^{th}$ display component is not movable (NO in step S2204), that is, when a change in the arrangement order of the $N^{th}$ display component is prohibited, the table updating unit 246 proceeds to step S2207, which is described below.

If it is determined in step S2204 that the $N^{th}$ display component is movable (YES in step S2204), that is, when a change in the arrangement order of the $N^{th}$ display component is allowed, the table updating unit 246 proceeds to step S2205.

Note that processes from step S2205 to step S2209 of FIG. 22 are substantially identical to the processes from step S703 to step S707 of FIG. 7, and as such, descriptions thereof will be omitted.

FIGS. 23A and 23B illustrate an example case of updating the layout management table 262B according to the third embodiment. FIG. 23A illustrates the layout management table 262B prior to being updated, and FIG. 23B illustrates a layout management table 262B-1 that has been updated.

Note FIGS. 23A and 23B illustrates an example case where the layout management table 262B is updated in response to an operation made with respect to the display component corresponding to the setting item "staple" displayed on the setting screen and the value "upper left diagonal" is set up for the setting item "staple".

When the value "upper left diagonal" is set up for the setting item "staple", a value cannot be set up for the setting item "hole punch" or the setting item "booklet" in combination with the value "upper left diagonal" for the setting item "staple". Also, according to the layout management table 262B, the arrangement order of the display component corresponding to the setting item "hole punch" cannot be changed.

Thus, in the layout management table 262B-1, the table updating unit 246 sets the value "x" for the information item "selectability" associated with the setting item "hole punch" without changing the "order" of the setting item "hole punch". Also, the table updating unit 246 changes the value indicating the "order" of the setting item "booklet" to "11" to be last among the setting items corresponding to the displayable display components but before the setting item "external paper supply" corresponding to a non-displayable display component.

Figure 24:
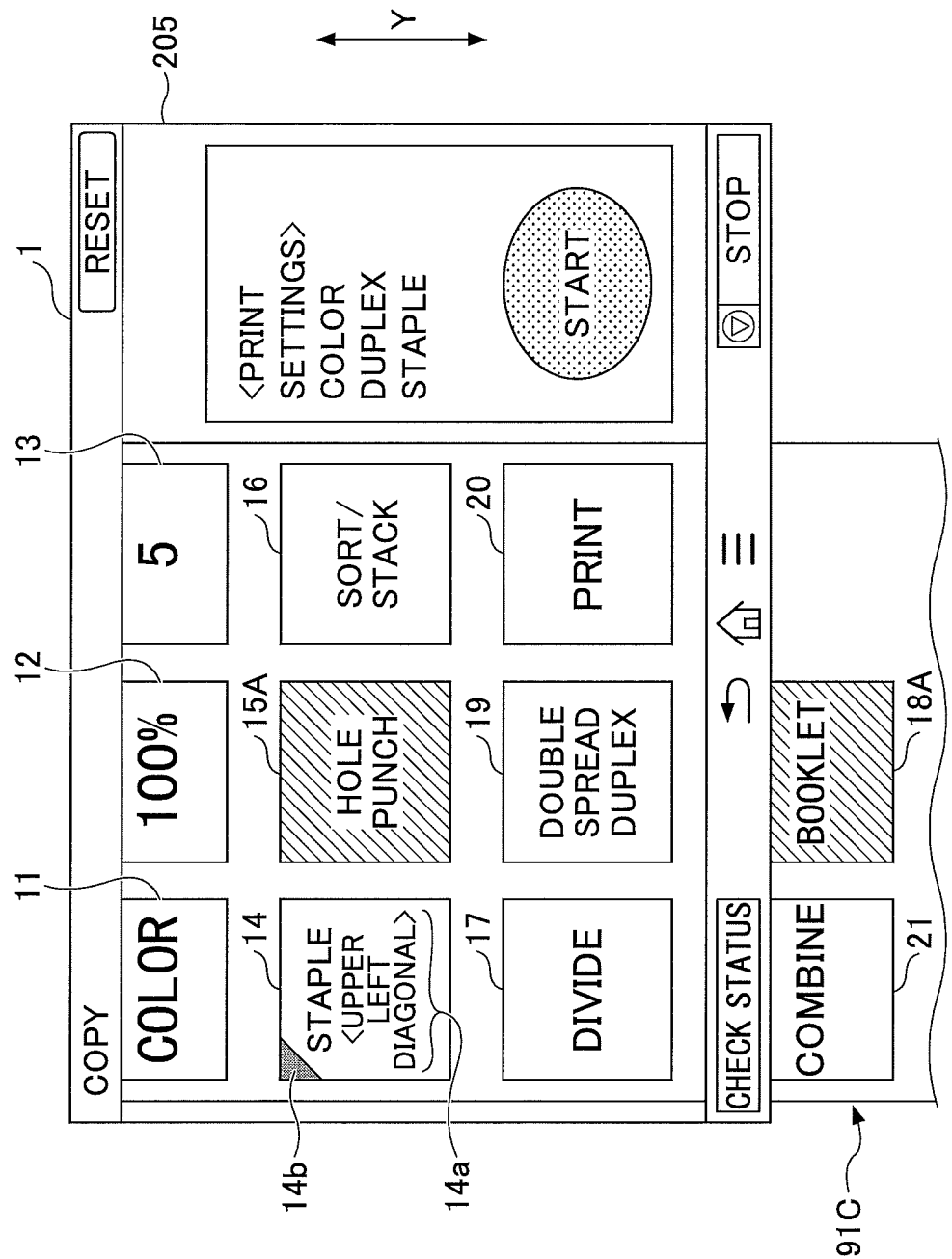
FIG. 24 is a diagram illustrating an example of the setting screen according to the third embodiment.

In the following, the setting screen 1 that is displayed based on the layout management table 262B-1 according to the present embodiment is described with reference to FIG. 24. FIG. 24 illustrates an example of the setting screen 1 according to the third embodiment.

The setting screen 1 of FIG. 24 illustrates an example case where a setting screen image 91C based on the layout management table 262B-1 is displayed on the operation panel 205.

According to the layout management table 262B-1 of the present embodiment, the display item corresponding to the setting item "external paper supply" with the value "12" set up as its "order" corresponds to a non-displayable display component. As such, the display component 22 corresponding to the setting item "external paper supply" is not displayed in the setting screen image 91C.

Also, in the setting screen image 91C, the display component 18A corresponding to the setting item "booklet" is moved to the end of the display components displayed in the setting screen image 91C, but the arrangement order of the display component 15A corresponding to the setting item "hole punch" is not changed. Note that the display component 15A is displayed at a lower brightness level as compared with the brightness level of the other configurable display components, such as the display components 14 are 16, so that the display component 15A can be visually recognized as a non-configurable display component. The display component 18A is also displayed at the lower brightness level.

As described above, according to an aspect of the present embodiment, the position of a display component corresponding to a setting item that is frequently changed may be prevented from being changed (moved), and in this way, a display component that is frequently operated (i.e., display component that is frequently used) may always be displayed at the same position in the setting screen image. Thus, a user may be prevented from losing sight of a display component that he/she wishes to operate at the operation panel 205 and the display component may be promptly operated.

Note that in the above-described example, whether the arrangement order of a display component can be changed is determined based on the setting change frequency of the setting item corresponding to the display component. However, embodiments of the present invention are not limited thereto. For example, whether to enable a change in the arrangement order of a display component may be set up by the user in advance.

For example, if the display component corresponding to the setting item "hole punch" is extensively used, settings may be configured to disable a change in the arrangement order of the display component corresponding to the setting item "hole punch".

Although the present invention has been described above with reference to certain illustrative embodiments, the present invention is not limited to these embodiments, and numerous variations and modifications may be made without departing from the scope of the present invention.

What is claimed is:

1. An information processing apparatus comprising:
a memory storing a program; and
a processor configured to execute the program to implement processes of:
receiving a selection of a setting item from among a plurality of setting items, the plurality of setting items corresponding to a plurality of first display components that are arranged in an image of a first setting screen that is displayed on a display device;
displaying a second setting screen, in place of the first setting screen, the second setting screen enabling setup of a detailed setting that relates to the setting item selected in the first setting screen;

setting the detailed setting, in the second setting screen, for the selected setting item selected in the first setting screen based on an operation of a second display component from among a plurality of second display components that corresponds to the selected setting item selected in the first setting screen; and determining whether a prohibited setting item is included among the plurality of setting items, the prohibited setting item corresponding to a setting item whose set up is incompatible in combination with the selected setting item; and when the processor determines that the prohibited setting item is included among the plurality of setting items, changing a position of a non-configurable display component corresponding to the prohibited setting item in the first setting screen, wherein when a staple setting is selected as the selected setting item from among the plurality of setting items, a booklet setting corresponds to the prohibited setting item that is prohibited from being set up in combination with the staple setting, and a display component for the booklet setting as the non-configurable display component is arranged to be non-selectable and is displayed at a lower brightness level than a normal brightness level for displaying configurable display components of the plurality of first display components, or moved to the end of the plurality of first display components that are arranged in the image.

2. The information processing apparatus according to claim 1, wherein the processor further implements processes of:

arranging the position of the non-configurable display component corresponding to the prohibited setting item to be at the end of the plurality of first display components that are arranged in the image; and moving up a position of at least one first display component of the plurality of first display components that was previously positioned after the non-configurable display component.

3. The information processing apparatus according to claim 1, wherein the non-configurable display component corresponding to the prohibited setting item is displayed in a display mode that differs from a normal display mode for displaying configurable display components of the plurality of first display components.

4. The information processing apparatus according to claim 1, wherein the processor further implements processes of:

determining whether an unavailable setting item relating to a function other than a function provided by the information processing apparatus is included among the plurality of setting items;

specifying a first display component of the plurality of first display components corresponding to the unavailable setting item as a non-displayable display component; and arranging a position of the non-displayable display component corresponding to the unavailable setting item to be at the end of the plurality of first display components that are arranged in the image.

5. The information processing apparatus according to claim 4, wherein the processor further implements a process of:

arranging the position of the non-configurable display component corresponding to the prohibited setting item to come before the non-displayable display component corresponding to the unavailable setting item and after configurable display components of the plurality of first display components corresponding to non-prohibited setting items that are not prohibited from being set up in combination with the selected setting item.

6. The information processing apparatus according to claim 1, wherein the processor further implements processes of determining whether a non-movable display component that cannot be rearranged within the image is included among the plurality of first display components based on a setting change frequency of each of the plurality of setting items corresponding to the plurality of first display components; and when the setting change frequency of the prohibited setting item is greater than or equal to a predetermined threshold, refraining from changing the position of the non-configurable display component corresponding to the prohibited setting item.

7. The information processing apparatus according to claim 6, wherein a setting item of the plurality of setting items corresponding to the non-movable display component is specified in advance.

8. An image processing apparatus comprising:
the information processing apparatus according to claim 1.

9. The information processing apparatus according to claim 1, further comprising:

an operation apparatus that includes a display device; and
a main apparatus that includes at least one of a scanner and a plotter.

10. The information processing apparatus according to claim 1, wherein the determining of whether the prohibited setting item is included among the plurality of setting items further comprises:

referring to a prohibited condition table that indicates setting items for which selection is prohibited in conjunction with the selected setting item.

11. The information processing apparatus according to claim 1, wherein the display device is an operation panel of the information processing apparatus.

12. The information processing apparatus according to claim 1, wherein the plurality of first display components arranged in the image of the first setting screen are displayed on the display device in an order based on a frequency of operation of the first display components.

13. A computer program product comprising a non-transitory computer-readable medium having a program recorded thereon that is executable by a computer, the program when executed causing the computer to perform processes of:

receiving a selection of a setting item from among a plurality of setting items, the plurality of setting items corresponding to a plurality of first display components that are arranged in an image of a first setting screen that is displayed on a display device;

displaying a second setting screen, in place of the first setting screen, the second setting screen enabling setup of a detailed setting that relates to the setting item selected in the first setting screen;

setting the detailed setting, in the second setting screen, for the selected setting item selected in the first setting screen based on an operation of a second display component from among a plurality of second display components that corresponds to the selected setting item selected in the first setting screen; and determining whether a prohibited setting item is included among the plurality of setting items, the prohibited setting item corresponding to a setting item whose set up is incompatible in combination with the selected setting item; and when it is determined that the prohibited setting item is included among the plurality of setting items, changing a position of a non-configurable display component corresponding to the prohibited setting item within the image in the first setting screen, wherein when a staple setting is selected as the selected setting item from among the plurality of setting items, a booklet setting corresponds to the prohibited setting item that is prohibited from being set up in combination with the staple setting, and a display component for the booklet setting as the non-configurable display component is arranged to be non-selectable and is
- displayed at a lower brightness level than a normal brightness level for displaying configurable display components of the plurality of first display components, or
- moved to the end of the plurality of first display components that are arranged in the image.

14. The computer program product according to claim 13, wherein the plurality of first display components arranged in the image of the first setting screen are displayed on the display device in an order based on a frequency of operation of the first display components.

15. An information processing apparatus comprising:
a memory storing a program; and
a processor configured to execute the program to implement processes of:
  receiving a selection of a setting item from among a plurality of setting items, the plurality of setting items corresponding to a plurality of first display components that are arranged in an image of a first setting screen that is displayed on a display device;
  displaying a second setting screen, in place of the first setting screen, the second setting screen enabling setup of a detailed setting that relates to the setting item selected in the first setting screen;
  setting the detailed setting, in the second setting screen, for the selected setting item selected in the first setting screen based on an operation of a second display component from among a plurality of second display components that corresponds to the selected setting item selected in the first setting screen; and
  determining whether a prohibited setting item is included among the plurality of setting items, the prohibited setting item corresponding to a setting item whose set up is incompatible in combination with the selected setting item; and
  when the processor determines that the prohibited setting item is included among the plurality of setting items, changing a position of a non-configurable display component corresponding to the prohibited setting item in the first setting screen, wherein when a certain value is set up for a staple setting that is selected as the selected setting item from among the plurality of setting items, a hold punch setting corresponds to the prohibited setting item that is prohibited from being set up in combination with the certain value set up for the staple setting, and a display component for the hole punch setting is arranged to be non-selectable and is
- displayed at a lower brightness level than a normal brightness level for displaying configurable display components of the plurality of first display components, or
- moved to the end of the plurality of first display components that are arranged in the image.

16. The image processing apparatus according to claim 15, wherein the plurality of first display components arranged in the image of the first setting screen are displayed on the display device in an order based on a frequency of operation of the first display components.

* * * * *